US010225831B2

(12) United States Patent
Aiba et al.

(10) Patent No.: US 10,225,831 B2
(45) Date of Patent: Mar. 5, 2019

(54) TERMINAL DEVICE, BASE STATION DEVICE, COMMUNICATION METHOD, AND INTEGRATED CIRCUIT FOR DECODING A PHYSICAL DOWNLINK SHARED CHANNEL IN A NON-MBSFN SUBFRAME

(71) Applicant: Sharp Kabushiki Kaisha, Sakai, Osaka (JP)

(72) Inventors: Tatsushi Aiba, Sakai (JP); Kazuyuki Shimezawa, Sakai (JP); Shoichi Suzuki, Sakai (JP); Kimihiko Imamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 126 days.

(21) Appl. No.: 15/405,680

(22) Filed: Jan. 13, 2017

(65) Prior Publication Data

US 2017/0127392 A1 May 4, 2017

Related U.S. Application Data

(63) Continuation of application No. 14/415,789, filed as application No. PCT/JP2013/068939 on Jul. 11, 2013, now Pat. No. 9,565,666.

(30) Foreign Application Priority Data

Jul. 23, 2012 (JP) .................. 2012-162183

(51) Int. Cl.
*H04W 72/04* (2009.01)
*H04W 72/12* (2009.01)
(Continued)

(52) U.S. Cl.
CPC ......... *H04W 72/042* (2013.01); *H04L 1/0046* (2013.01); *H04L 1/0067* (2013.01);
(Continued)

(58) Field of Classification Search
None
See application file for complete search history.

(56) References Cited

U.S. PATENT DOCUMENTS

| 8,805,448 B2* | 8/2014 | Nam | H04L 5/0094 455/561 |
| 2010/0331030 A1* | 12/2010 | Nory | H04L 5/0053 455/509 |

(Continued)

OTHER PUBLICATIONS

Aiba et al., "Terminal Device, Base Station Device, Communication Method, and Integrated Circuit for Decoding a Physical Downlink Shared Channel in a Non-MBSFN Subframe", U.S. Appl. No. 14/415,789, filed Jan. 20, 2015.
(Continued)

*Primary Examiner* — Anh Ngoc M Nguyen
(74) *Attorney, Agent, or Firm* — Keating & Bennett, LLP

(57) ABSTRACT

A terminal device includes means of determining resource elements to which a physical downlink shared channel is mapped for transmission on the physical downlink shared channel in a non-MBSFN subframe that is scheduled by using a downlink control information format 1A based on positions of cell-specific reference signals that are provided by using a physical layer cell identity.

12 Claims, 10 Drawing Sheets

(51) Int. Cl.
*H04L 5/00* (2006.01)
*H04L 1/00* (2006.01)

(52) U.S. Cl.
CPC ............ *H04L 1/0072* (2013.01); *H04L 5/005* (2013.01); *H04L 5/0044* (2013.01); *H04L 5/0051* (2013.01); *H04L 5/0091* (2013.01); *H04W 72/0446* (2013.01); *H04W 72/1289* (2013.01); *H04L 1/0068* (2013.01); *H04L 5/0073* (2013.01)

(56) References Cited

U.S. PATENT DOCUMENTS

2012/0195267 A1* 8/2012 Dai ..................... H04L 1/0072
370/329
2015/0016369 A1* 1/2015 Park ..................... H04B 7/024
370/329

OTHER PUBLICATIONS

"3rd Generation Partnership Project; Technical Specification Group Radio Access Network; Evolved Universal Terrestrial Radio Access (E-UTRA); Physical Channels and Modulation (Release 10)", 3GPP TS 36.211 V105.0, Jun. 2012, 5 pages.

\* cited by examiner

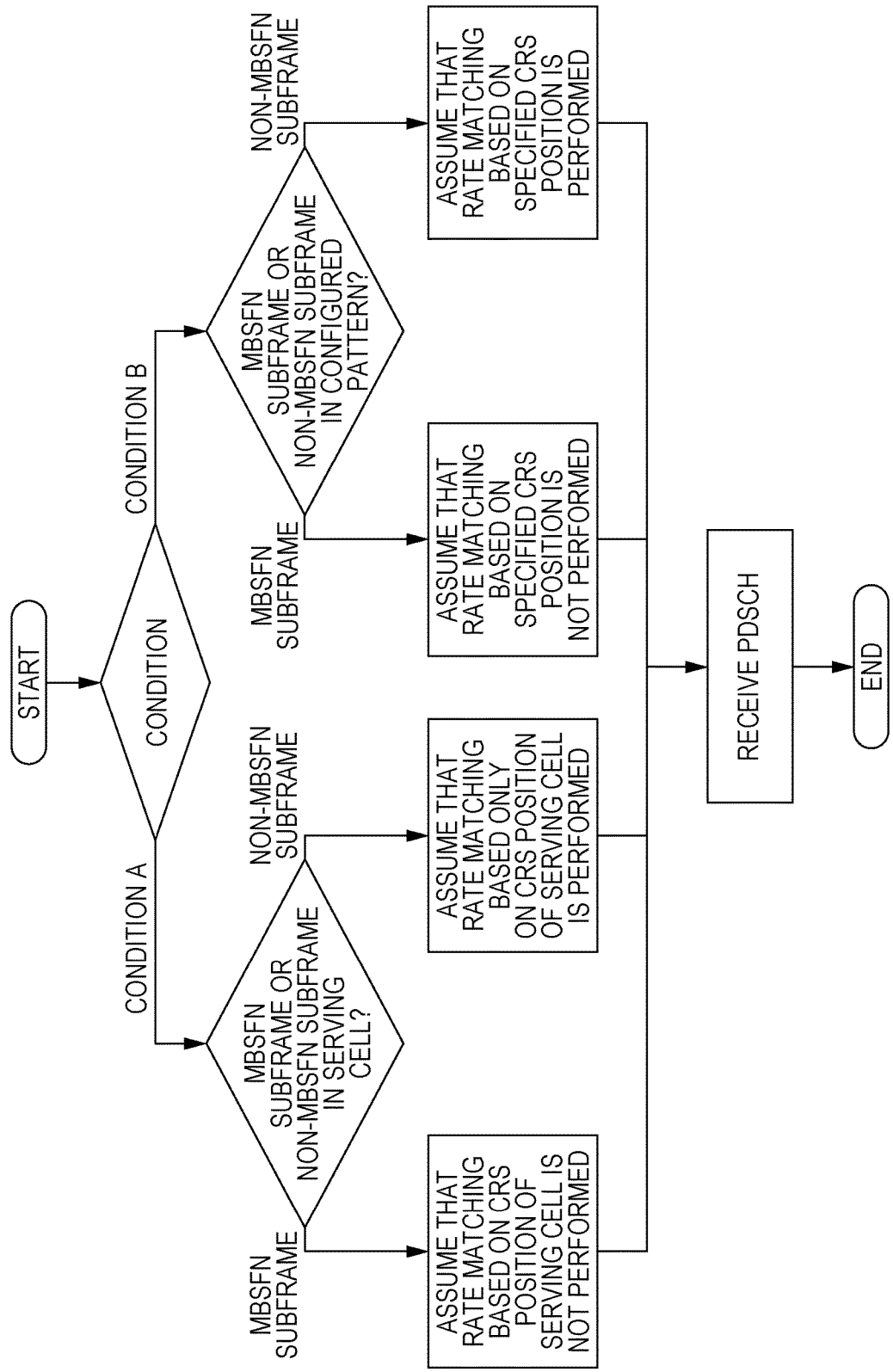

TERMINAL DEVICE, BASE STATION DEVICE, COMMUNICATION METHOD, AND INTEGRATED CIRCUIT FOR DECODING A PHYSICAL DOWNLINK SHARED CHANNEL IN A NON-MBSFN SUBFRAME

TECHNICAL FIELD

The present invention relates to a terminal device, a base station device, a communication method, and an integrated circuit.

BACKGROUND ART

In radio communication systems such as Long Term Evolution (LTE) and LTE-Advanced (LTE-A) by Third Generation Partnership Project (3GPP) and Worldwide Interoperability for Microwave Access (WiMAX) by the Institute of Electrical and Electronics Engineers (IEEE), each of base station devices and terminal devices includes single or plural transmit-receive antenna, and a multiple-input multiple-output (MIMO) technology is used, thereby enabling realization of high speed data transmission.

Here, a discussion has been held about support for multiple-user MIMO (MU-MIMO) in which plural terminal devices perform spatial multiplexing by using same frequency and time resources in radio communication systems. Further, a discussion has been held about support for a cooperative multipoint (CoMP) transmission scheme in which plural base station devices cooperatively perform interference coordination. For example, a discussion has been held about a radio communication system in heterogeneous network deployment (HetNet) with a macro base station that has wide coverage, a remote radio head (RRH) that has narrower coverage than the macro base station, or the like.

A suggestion has been made that in such a radio communication system, for example, the base station device and the terminal device transmit and receive downlink data by a physical downlink shared channel (PDSCH) based on resource elements to which cell-specific reference signals are mapped (NPL 1).

CITATION LIST

Non Patent Literature

NPL 1: PDSCH mapping issues in CoMP; 3GPP TSG RAN WG1 meeting #69 R1-122603, May 21-25, 2012.

DISCLOSURE OF THE INVENTION

Problems to be Solved by the Invention

However, there is no description about specific procedures in a case where the base station device and the terminal device transmit and receive the downlink data based on resource elements to which a physical signal or a physical channel is mapped in the above-described radio communication system.

The present invention has been made in consideration of the above problem, and an object thereof is to provide a terminal device, a base station device, a communication method, and an integrated circuit that allow a base station device and a terminal device to transmit and receive downlink data based on resource elements to which a physical signal or a physical channel is mapped and to perform efficient communication.

Means for Solving the Problems (1) To achieve the above object, measures described below are employed in the present invention. That is, a terminal device in the present invention is a terminal device that communicates with a base station device, the terminal device including: means of determining resource elements to which a physical downlink shared channel is mapped for transmission on the physical downlink shared channel in a non-MBSFN subframe that is scheduled by using a downlink control information format 1A based on positions of cell-specific reference signals that are provided by using a physical layer cell identity; and means of determining resource elements to which the physical downlink shared channel is mapped for transmission on the physical downlink shared channel in the non-MB SFN subframe that is scheduled by using a downlink control information format that is different from the downlink control information format 1A based on positions of cell-specific reference signals that are indicated by using control information that is included in the downlink control information format, in which the control information is used to indicate one value among four values that are associated with the positions of the cell-specific reference signals, and the four values that are associated with the positions of the cell-specific reference signals are configured by using higher layer signaling.

(2) Further, a base station device in the present invention is a base station device that communicates with a terminal device, the base station device including: means of determining resource elements to which a physical downlink shared channel is mapped for transmission on the physical downlink shared channel in a non-MBSFN subframe that is scheduled by using a downlink control information format 1A based on positions of cell-specific reference signals that are provided by using a physical layer cell identity; and means of determining resource elements to which the physical downlink shared channel is mapped for transmission on the physical downlink shared channel in the non-MBSFN subframe that is scheduled by using a downlink control information format that is different from the downlink control information format 1A based on positions of cell-specific reference signals that are indicated by using control information that is included in the downlink control information format, in which the control information is used to indicate one value among four values that are associated with the positions of the cell-specific reference signals, and the four values that are associated with the positions of the cell-specific reference signals are configured by using higher layer signaling.

(3) Further, a communication method in the present invention is a communication method of a terminal device that communicates with a base station device, the communication method including: determining resource elements to which a physical downlink shared channel is mapped for transmission on the physical downlink shared channel in a non-MBSFN subframe that is scheduled by using a downlink control information format 1A based on positions of cell-specific reference signals that are provided by using a physical layer cell identity; and determining resource elements to which the physical downlink shared channel is mapped for transmission on the physical downlink shared channel in the non-MBSFN subframe that is scheduled by using a downlink control information format that is different from the downlink control information format 1A based on positions of cell-specific reference signals that are indicated by using control information that is included in the downlink control information format, in which the control information is used to indicate one value among four values that are associated with the positions of the cell-specific reference signals, and the four values that are associated with the positions of the cell-specific reference signals are configured by using higher layer signaling.

(4) Further, a communication method in the present invention is a communication method of a base station device that communicates with a terminal device, the communication method including: determining resource elements to which a physical downlink shared channel is mapped for transmission on the physical downlink shared channel in a non-MBSFN subframe that is scheduled by using a downlink control information format 1A based on positions of cell-specific reference signals that are provided by using a physical layer cell identity; and determining resource elements to which the physical downlink shared channel is mapped for transmission on the physical downlink shared channel in the non-MBSFN subframe that is scheduled by using a downlink control information format that is different from the downlink control information format 1A based on positions of cell-specific reference signals that are indicated by using control information that is included in the downlink control information format, in which the control information is used to indicate one value among four values that are associated with the positions of the cell-specific reference signals, and the four values that are associated with the positions of the cell-specific reference signals are configured by using higher layer signaling.

(5) Further, an integrated circuit in the present invention is an integrated circuit that is installed in a terminal device that communicates with a base station device, in which the integrated circuit causes the terminal device to provide: a function of determining resource elements to which a physical downlink shared channel is mapped for transmission on the physical downlink shared channel in a non-MBSFN subframe that is scheduled by using a downlink control information format 1A based on positions of cell-specific reference signals that are provided by using a physical layer cell identity; and a function of determining resource elements to which the physical downlink shared channel is mapped for transmission on the physical downlink shared channel in the non-MBSFN subframe that is scheduled by using a downlink control information format that is different from the downlink control information format 1A based on positions of cell-specific reference signals that are indicated by using control information that is included in the downlink control information format, and in which the control information is used to indicate one value among four values that are associated with the positions of the cell-specific reference signals, and the four values that are associated with the positions of the cell-specific reference signals are configured by using higher layer signaling.

(6) Further, an integrated circuit in the present invention is an integrated circuit that is installed in a base station device that communicates with a terminal device, in which the integrated circuit causes the base station device to provide: a function of determining resource elements to which a physical downlink shared channel is mapped for transmission on the physical downlink shared channel in a non-MBSFN subframe that is scheduled by using a downlink control information format 1A based on positions of cell-specific reference signals that are provided by using a physical layer cell identity; and a function of determining resource elements to which the physical downlink shared channel is mapped for transmission on the physical downlink shared channel in the non-MBSFN subframe that is scheduled by using a downlink control information format that is different from the downlink control information format 1A based on positions of cell-specific reference signals that are indicated by using control information that is included in the downlink control information format, and in which the control information is used to indicate one value among four values that are associated with the positions of the cell-specific reference signals, and the four values that are associated with the positions of the cell-specific reference signals are configured by using higher layer signaling.

Effects of the Invention

The present invention allows a base station device and a mobile station device to transmit and receive downlink data based on resource elements to which a physical signal or a physical channel is mapped and to perform efficient communication.

BRIEF DESCRIPTION OF THE DRAWINGS

FIG. 10 is another diagram that illustrates an example of a processing flow according to this embodiment.

MODE FOR CARRYING OUT THE INVENTION

An embodiment of the present invention will hereinafter be described. A radio communication system in the embodiment of the present invention includes a primary base station (also referred to as macro base station, first base station, first communication device, serving base station, anchor base station, or primary cell) and a secondary base station (also referred to as RRH, pico base station, femto base station, Home eNodeB, second base station device, second communication device, cooperative base station group, cooperative base station set, cooperative base station, or secondary cell) as a base station device (also referred to as base station, transmitting device, cell, serving cell, transmitting station, transmitting point, transmit antenna group, transmit antenna port group, or eNodeB). Further, the radio communication system includes a mobile station device (also referred to as terminal, terminal device, mobile terminal, receiving device, receiving point, receiving terminal, third communication device, receive antenna group, receive antenna port group, or user equipment (UE)).

Here, for example, heterogeneous network deployment may be applied to the primary base station and the secondary base station, a unit or whole of coverage of the secondary base station may be included in coverage of the primary base station. Further, the secondary base station may be plural secondary base stations.

Figure 1:
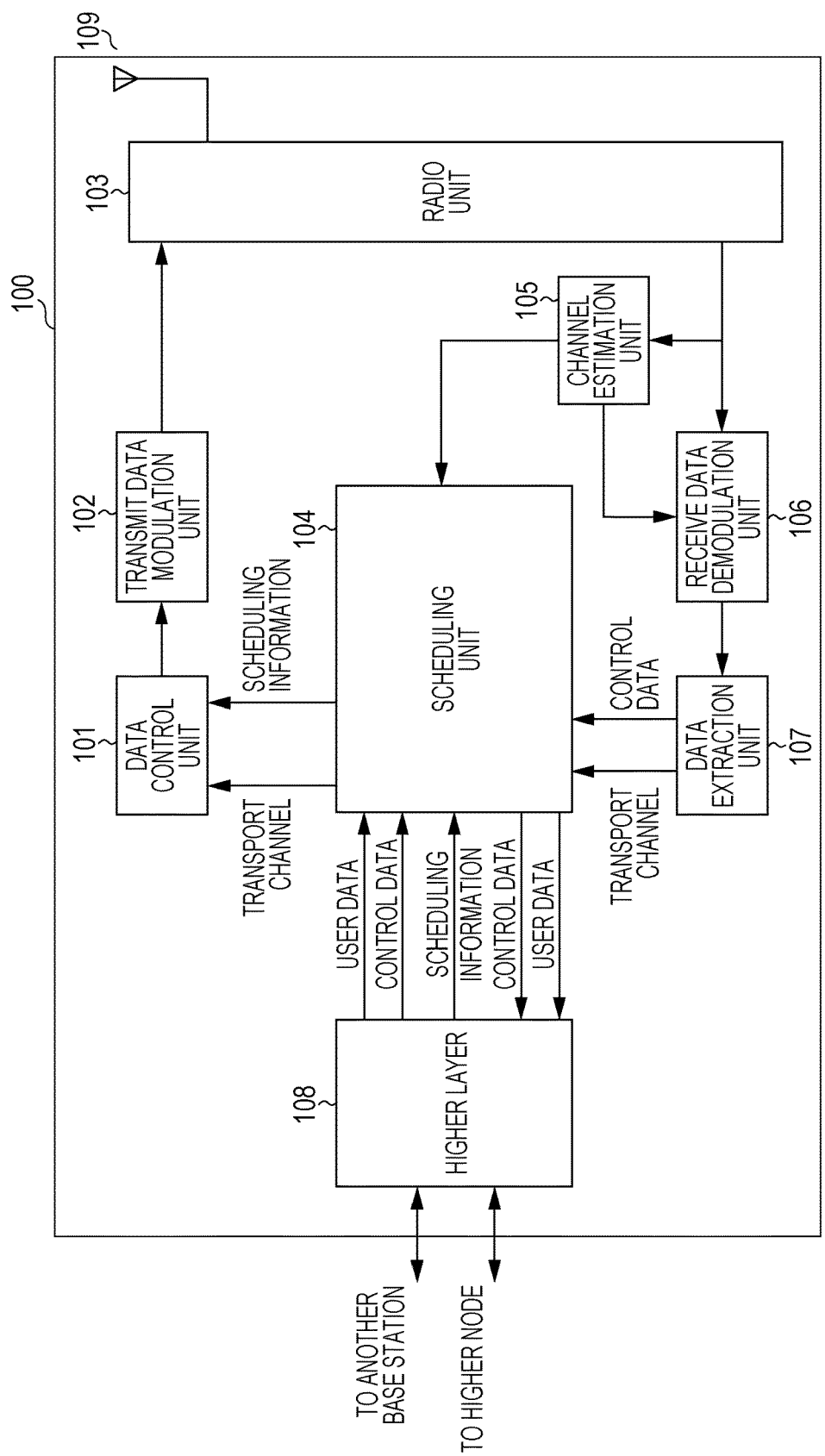
FIG. 1 is a schematic block diagram that illustrates a configuration of a base station device according to this embodiment.

FIG. 1 is a schematic block diagram that illustrates a configuration of the base station device according to this embodiment. Here, a base station device 100 illustrated in FIG. 1 includes the primary base station and the secondary base station. The base station device 100 is configured to include a data control unit 101, a transmit data modulation unit 102, a radio unit 103, a scheduling unit 104, a channel estimation unit 105, a receive data demodulation unit 106, a data extraction unit 107, a higher layer 108, and an antenna 109. Further, a receiving unit is configured with the radio unit 103, the scheduling unit 104, the channel estimation unit 105, the receive data demodulation unit 106, the data extraction unit 107, the higher layer 108, and the antenna 109. Further, a transmitting unit is configured with the data control unit 101, the transmit data modulation unit 102, the radio unit 103, the scheduling unit 104, the higher layer 108, and the antenna 109. Here, the units that configure the base station device 100 may also be referred to as units.

The data control unit 101 receives transport channels from the scheduling unit 104. The data control unit 101 maps signals generated by the transport channels and physical layers on physical channels based on scheduling information that is input from the scheduling unit 104. Mapped data are output to the transmit data modulation unit 102.

Further, the data control unit 101 maps a PDSCH to a resource element based on a resource element to which a physical signal or physical channel is mapped. For example, the data control unit 101 performs rate-matching based on a position of a cell-specific reference signal that is determined in accordance with a physical layer cell identity. Further, the data control unit 101 performs rate-matching based on the position of the cell-specific reference signal that is specified for the terminal.

The transmit data modulation unit 102 modulates and codes transmit data. The transmit data modulation unit 102 performs signal processing such as modulation and coding, serial-parallel conversion of input signals, an Inverse Fast Fourier Transform (IFFT) process, and cyclic prefix (CP) insertion with respect to the data input from the data control unit 101 based on the scheduling information or the like from the scheduling unit 104, generates the transmit data, and output the transmit data to the radio unit 103.

The radio unit 103 performs up-conversion of the transmit data input from the transmit data modulation unit 102 into radio frequencies to generate radio signals and transmits the radio signals to the terminal via the antenna 109. Further, the radio unit 103 receives the radio signals that are received from the terminal via the antenna 109, performs down-conversion of the radio signals into baseband signals, and outputs the receive data to the channel estimation unit 105 and the receive data demodulation unit 106.

The scheduling unit 104 performs mapping of logical channels and the transport channels, scheduling for a downlink and an uplink, and so forth. The scheduling unit 104 integrally controls process units of the physical layers. Thus, interfaces are present between the scheduling unit 104 and the antenna 109, the radio unit 103, the channel estimation unit 105, the receive data demodulation unit 106, the data control unit 101, the transmit data modulation unit 102, and the data extraction unit 107.

Further, in the scheduling for the downlink, the scheduling unit 104 performs transmission control of the transport channels and the physical channels and generation of scheduling information based on uplink control information that is received from the terminal, scheduling information that is input from the higher layer 108, and so forth. The scheduling information that is used for the scheduling for the downlink is output to the data control unit 101.

Further, in the scheduling for the uplink, the scheduling unit 104 performs generation of scheduling information based on uplink channel states that are output by the channel estimation unit 105, scheduling information that is input from the higher layer 108, and so forth. The scheduling information that is used for the scheduling for the uplink is output to the data control unit 101.

Further, the scheduling unit 104 maps downlink logical channels that are input from the higher layer 108 on the transport channels and outputs the downlink logical channels to the data control unit 101. Further, the scheduling unit 104 processes uplink transport channels and control data that are input from the data extraction unit 107 as necessary, thereafter maps the uplink transport channels and the control data on uplink logical channels, and output those to the higher layer 108.

In order to demodulate signals that are transmitted by the uplink, the channel estimation unit 105 estimates the uplink channel states from uplink reference signals (for example, demodulation reference signals) and outputs the uplink channel states to the receive data demodulation unit 106. Further, in order to perform the scheduling for the uplink, the channel estimation unit 105 estimates the uplink channel states from uplink reference signals (for example, sounding reference signals) and outputs the uplink channel states to the scheduling unit 104.

The receive data demodulation unit 106 demodulates the receive data. The receive data demodulation unit 106 performs signal processing such as DFT conversion, subcarrier mapping, or the IFFT conversion with respect to modulated data that are input from the radio unit 103 based on estimation results of the uplink channel states that are input from the channel estimation unit 105, thereby applies a demodulation process to the modulated data, and outputs the demodulated data to the data extraction unit 107.

The data extraction unit 107 confirms whether the receive data input from the receive data demodulation unit 106 are correct or incorrect and outputs a confirmation result (for example, ACK or NACK) to the scheduling unit 104. Further, the data extraction unit 107 separates the data input from the receive data demodulation unit 106 into the transport channels and control data of the physical layers and outputs those to the scheduling unit 104.

The higher layer 108 performs a process of a radio resource control (RRC) layer and a process of a medium access control (MAC) layer. The higher layer 108 integrally controls process units of lower layers. Thus, interfaces are present between the higher layer 108 and the scheduling unit 104, the antenna 109, the radio unit 103, the channel estimation unit 105, the receive data demodulation unit 106, the data control unit 101, the transmit data modulation unit 102, and the data extraction unit 107.

Figure 2:
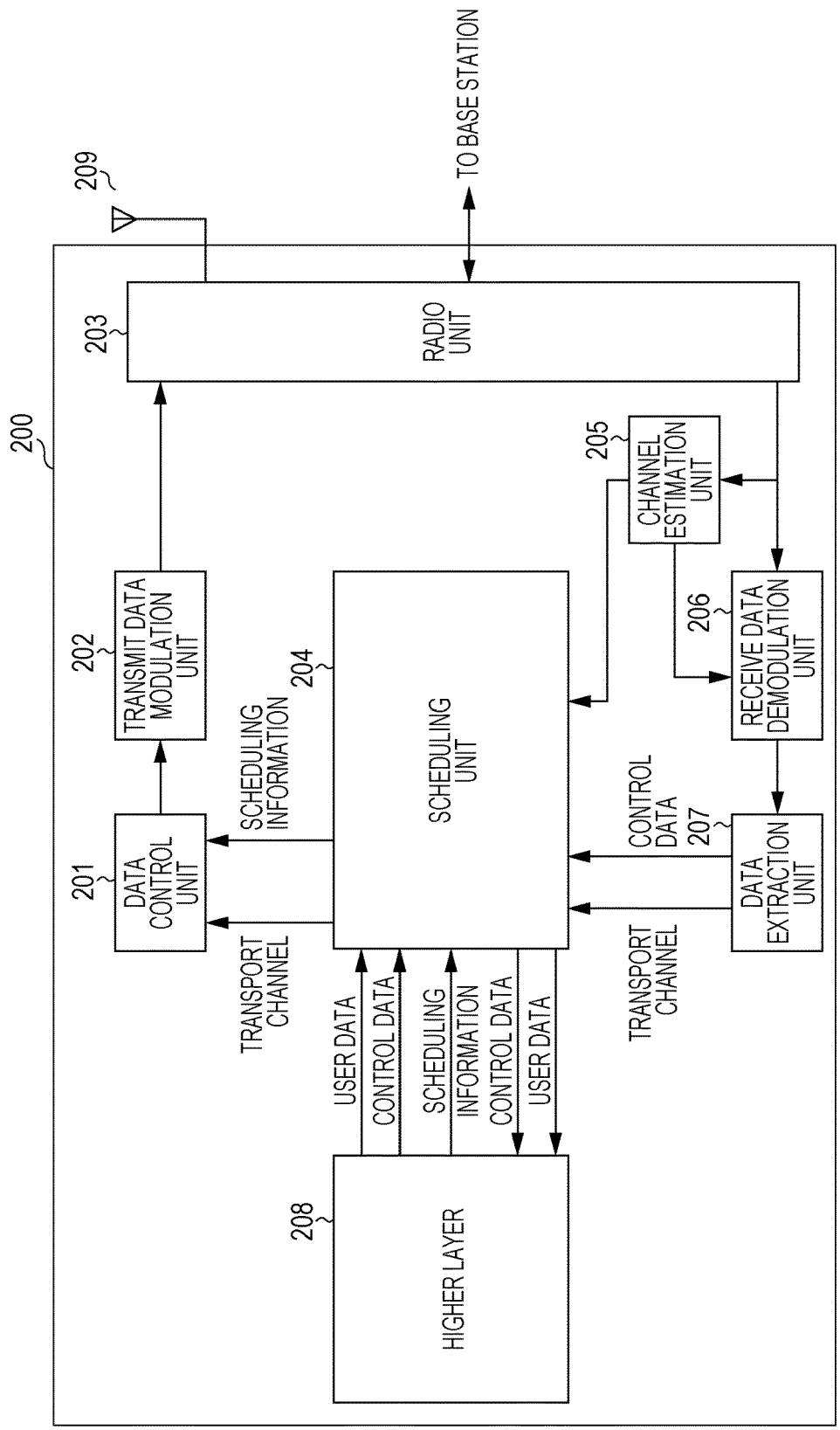
FIG. 2 is a schematic block diagram that illustrates a configuration of a terminal device according to this embodiment.

FIG. 2 is a schematic block diagram that illustrates a configuration of a terminal device according to this embodiment. A terminal device 200 is configured to include a data control unit 201, a transmit data modulation unit 202, a radio unit 203, a scheduling unit 204, a channel estimation unit 205, a receive data demodulation unit 206, a data extraction unit 207, a higher layer 208, and an antenna 209. Further, a transmitting unit is configured with the data control unit 201, the transmit data modulation unit 202, the radio unit 203, the scheduling unit 204, the higher layer 208, and the antenna 209. Further, a receiving unit is configured with the radio unit 203, the scheduling unit 204, the channel estimation unit 205, the receive data demodulation unit 206, the data extraction unit 207, the higher layer 208, and the antenna 209. Here, the units that configure the terminal device 200 may also be referred to as units.

The data control unit 201 receives the transport channels from the scheduling unit 204. The data control unit 201 maps signals generated by the transport channels and the physical layers on the physical channels based on scheduling information that is input from the scheduling unit 204. Mapped data are output to the transmit data modulation unit 202.

The transmit data modulation unit 202 modulates and codes the transmit data. The transmit data modulation unit 202 performs signal processing such as modulation and coding, serial-parallel conversion of input signals, the IFFT process, and the CP insertion with respect to the data input from the data control unit 201, generates the transmit data, and output the transmit data to the radio unit 203.

The radio unit 203 performs up-conversion of the transmit data input from the transmit data modulation unit 202 into radio frequencies to generate radio signals and transmits the radio signals to the base station via the antenna 209. Further, the radio unit 203 receives the radio signals that are received from the base station via the antenna 209, performs down-conversion of the radio signals into baseband signals, and outputs the receive data to the channel estimation unit 205 and the receive data demodulation unit 206.

The scheduling unit 204 performs mapping of the logical channels and the transport channels, scheduling for the downlink and the uplink, and so forth. The scheduling unit 204 integrally controls process units of the physical layers. Thus, interfaces are present between the scheduling unit 204 and the antenna 209, the data control unit 201, the transmit data modulation unit 202, the channel estimation unit 205, the receive data demodulation unit 206, and the data extraction unit 207, and the radio unit 203.

Further, the scheduling unit 204 performs reception control of the transport channels and the physical channels and generation of scheduling information based on downlink control information that is received from the base station, scheduling information that is input from the higher layer 208, and so forth. The scheduling information that is used for the scheduling for the downlink is output to the data control unit 201.

Further, the scheduling unit 204 performs a scheduling process for mapping uplink logical channels input from the higher layer 208 on the transport channels and generation of scheduling information that is used for the scheduling for the uplink based on the downlink control information that is received from the base station, the scheduling information that is input from the higher layer 208, and so forth. The scheduling information is output to the data control unit 201.

Further, the scheduling unit 204 maps the uplink logical channels that are input from the higher layer 208 to the transport channels and outputs the uplink logical channels to the data control unit 201. Further, the scheduling unit 204 outputs channel state information that is input from the channel estimation unit 205 and a confirmation result of cyclic redundancy check (CRC) parity bits (simply referred to as CRCs also) that are input from the data extraction unit 207 to the data control unit 201.

In order to demodulate signals that are transmitted by the downlink, the channel estimation unit 205 estimates downlink channel states from downlink reference signals and outputs the downlink channel states to the receive data demodulation unit 206. Further, the receive data demodulation unit 206 demodulates the receive data that are input from the radio unit 203 and outputs the receive data to the data extraction unit 207.

Further, the receive data demodulation unit 206 receives the PDSCH that is mapped to the resource element based on the resource element to which the physical signal or physical channel is mapped (also described as demapping the PDSCH from the resource element). For example, the receive data demodulation unit 206 receives downlink data on an assumption that the rate-matching is performed based on the position of the cell-specific reference signal that is determined in accordance with the physical layer cell identity. Further, the receive data demodulation unit 206 receives the downlink data on an assumption that the rate-matching is performed based on the position of the cell-specific reference signal or the resource element that is specified by the base station device.

The data extraction unit 207 confirms whether the receive data input from the receive data demodulation unit 206 are correct or incorrect and outputs a confirmation result (for example, ACK or NACK) to the scheduling unit 204. Further, the data extraction unit 207 separates the receive data input from the receive data demodulation unit 206 into the transport channels and the control data of the physical layers and outputs those to the scheduling unit 204.

The higher layer 208 performs a process of the radio resource control layer and a process of the MAC layer. The higher layer 208 integrally controls process units of the physical layers. Thus, interfaces are present between the higher layer 208 and the scheduling unit 204, the antenna 209, the data control unit 201, the transmit data modulation unit 202, the channel estimation unit 205, the receive data demodulation unit 206, and the data extraction unit 207, and the radio unit 203.

Figure 3:
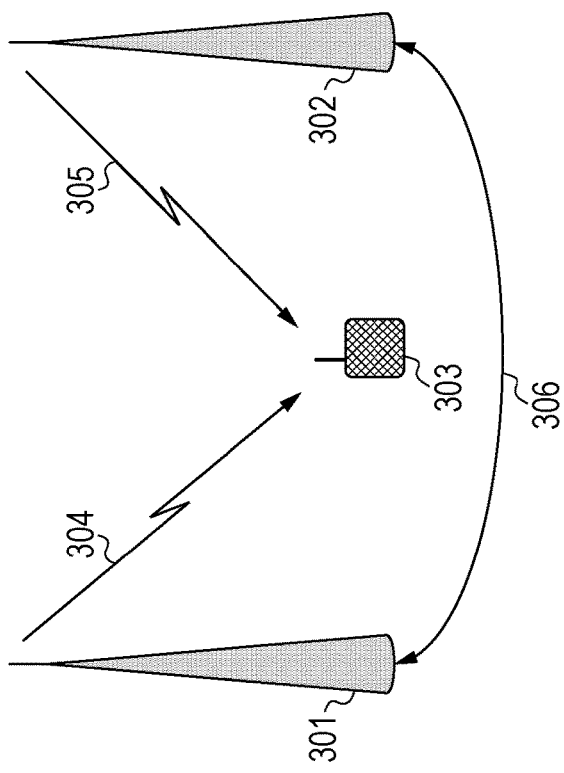
FIG. 3 is a schematic diagram that illustrates an example of a radio communication system according to this embodiment.

FIG. 3 is a schematic diagram that illustrates an example of a radio communication system according to this embodiment. In FIG. 3, for example, a terminal device 303 may perform single-cell communication with a primary base station 301 or a secondary base station 302. Further, the terminal device 303 may perform multi-cell communication with the primary base station 301 and/or the secondary base station 302.

Here, single-cell communication means that a single base station device transmits downlink information (a downlink signal) to a terminal device. For example, the terminal device 303 may receive downlink information that is transmitted from the primary base station 301 by a downlink 304 by a certain subframe. Further, the terminal device 303 may receive downlink information that is transmitted from the secondary base station 302 by a downlink 305 by another certain subframe.

Further, multi-cell communication means that plural base station devices mutually cooperate to transmit downlink information to a terminal device. For example, the terminal device 303 may receive downlink information that is transmitted from the primary base station 301 by the downlink 304 and downlink information that is transmitted from the secondary base station 302 by the downlink 305 by a same subframe.

Further, for example, as dynamic point selection that will be described below, the terminal device 303 may receive the downlink information that is transmitted from the primary base station 301 by the downlink 304 or the downlink information that is transmitted from the secondary base station 302 by the downlink 305 by a same subframe. In the multi-cell communication that performs the dynamic point selection, the terminal device 303 may perform a receiving process without recognizing from which base station device (transmitting point) the downlink information is transmitted.

For example, the multi-cell communication includes a CoMP transmission scheme. More specifically, the multi-cell communication includes joint transmission (JT) (or joint processing) in which same downlink information is transmitted from plural base station devices. Further, the multi-cell communication includes the dynamic point selection (DPS) that dynamically switches the base station devices that transmit the downlink information. Further, the multi-cell communication includes coordinated beamforming (CB) in which the base station devices cooperate to perform beamforming to reduce mutual interference. Further, the multi-cell communication includes coordinated scheduling (CS) in which the base station devices cooperate to perform scheduling to reduce mutual interference.

Here, for example, in a case where the joint transmission is used as the multi-cell communication, the terminal device 303 receives the downlink information that is transmitted by the downlink 304 and the downlink information that is transmitted by the downlink 305 by a certain subframe. Further, in a case where the dynamic point selection is used as the multi-cell communication, the terminal device 303 receives the downlink information that is transmitted by the downlink 304 or the downlink information that is transmitted by the downlink 305 by a certain subframe.

Further, communication between the base station devices (for example, interchange or the like of control information for performing the multi-cell communication or the single-cell communication) is performed through a line 306. For example, a wired line such as an optical fiber or a radio line such as a relay is used for the line 306.

Here, different physical layer cell identities (PCIs) (also referred to as physical layer cell identifiers) may be set for the primary base station 301 and the secondary base station 302. Further, a same physical layer cell identity may be set for all or a unit of the primary base station 301 and the secondary base station 302.

Here, the downlink information includes downlink data (downlink shared channel (DL-SCH)). Further, the downlink information includes information (multicast channel (MCH)) about Multimedia Broadcast and Multicast Service (MBMS). Further, the downlink information includes downlink control information (DCI).

Here, the DL-SCH and the MCH are the transport channels. Further, channels that are used for the medium access control (MAC) layer are referred to as transport channels. Further, a unit of the transport channels that are used in the MAC layer is referred to as transport block.

Further, the DL-SCH is mapped to the physical downlink shared channel (PDSCH). That is, the PDSCH is used to transmit the downlink data.

Further, the MCH is mapped to the physical multicast channel (PMCH). That is, the PMCH is used to transmit the information about the MBMS.

Further, the downlink control information is mapped to a physical downlink control channel (PDCCH). That is, the PDCCH is used to transmit the downlink control information.

Further, the downlink control information may be mapped to an enhanced physical downlink control channel (E-PDCCH) (a PDCCH that is enhanced). That is, the E-PDCCH is used to transmit the downlink control information.

Here, in a case where the base station device transmits the downlink information to the terminal device, the base station device multiplexes the downlink reference signals (DRSs) that are known signals between the base station device and the terminal device to transmit. For example, four types that will be described below are defined as the downlink reference signals. Here, the downlink reference signals are physical signals.

For example, cell-specific reference signals (CRSs) are defined as the downlink reference signals. Here, the cell-specific reference signals are also referred to as common reference signals (CRSs).

For example, the cell-specific reference signals are used by the terminal device for synchronization in downlink frequency domain and time domain. Further, the cell-specific reference signals are used to perform channel correction to the PDCCH. Further, the cell-specific reference signals are used to perform channel correction to the PDSCH. Further, the cell-specific reference signals are used by the terminal device for calculation of the downlink channel state information.

Further, the cell-specific reference signals are transmitted to plural terminal devices as targets. Further, the cell-specific reference signals are transmitted over all bands of the downlink. Further, the cell-specific reference signals are transmitted in all downlink subframes that support transmission of the PDSCH.

In addition, user equipment-specific reference signals (URSs) (also referred to as terminal-device-specific reference signals) are defined as the downlink reference signals. Here, the user equipment-specific reference signals are also referred to as demodulation reference signals (DMRSs).

For example, the user equipment-specific reference signals are used so that the terminal device performs channel correction to the E-PDCCH. Further, the user equipment-specific reference signals are used so that the terminal device performs channel correction to the PDSCH. Further, the user equipment-specific reference signals are transmitted to a specified terminal device as a target. Further, the user equipment-specific reference signals are transmitted only in resource blocks that are used for transmission of the PDSCH to a corresponding terminal device as a target.

Here, the user equipment-specific reference signals that are associated with the E-PDCCH may be different from the user equipment-specific reference signals that are associated with the PDSCH. For example, the antenna port that is used by the user equipment-specific reference signals associated with the E-PDCCH may be different from the antenna port that is used by the user equipment-specific reference signals associated with the PDSCH.

In addition, Multicast/Broadcast over Signal Frequency Network reference signals (MBSFN reference signals; MBSFN RSs) are defined as the downlink reference signals.

For example, the MBSFN reference signals are used so that the terminal device performs channel correction to the PMCH. Further, the MBSFN reference signals are transmitted to plural terminal devices as targets. Further, the MBSFN reference signals are transmitted over all the bands of the downlink. Further, the MBSFN reference signals are transmitted in subframes that are configured as MBSFN subframes by the base station device by using higher layer signaling.

That is, the base station device may configure subsets of a downlink subframe in a radio frame as the MBSFN subframes. Here, the MBSFN subframe represents a subframe that is reserved for the MBSFN subframe. For example, the MBSFN subframe is indicated for each serving cell based on parameters (hereinafter referred to as information about the MBSFN subframe also) that are transmitted by the base station device by using the higher layer signaling.

Here, the downlink subframes in the radio frame that are not configured as the MBSFN subframes are referred to as non-MBSFN subframes or unicast subframes.

For example, the base station device may perform transmission on the PDSCH but may not perform transmission on the PMCH in the non-MBSFN subframe. Further, the base station device may perform transmission on the PDSCH or the PMCH in the MBSFN subframe. The terminal device decodes the PDSCH in the MBSFN subframe other than the subframe that are indicated for decoding of the PMCH by using the higher layer signaling.

Further, each of the MBSFN subframes is divided into a non-MB SFN area and an MBSFN area. For example, the non-MBSFN area is configured with first one or two OFDM symbols in the MBSFN subframe. Further, the MBSFN area is configured with OFDM symbols in the MBSFN subframe that are not used as the non-MBSFN area.

Here, the non-MBSFN area is an area that is not reserved for an MBSFN. Further, the MBSFN area is an area that is reserved for the MBSFN. That is, the PMCH is transmitted only in the MBSFN area in a certain MBSFN subframe. Further, the PDSCH is transmitted only in the MBSFN area in a certain MBSFN subframe.

In addition, channel state information reference signals (CSI-RSs) are defined as the downlink reference signals.

For example, the channel state information reference signals are used by the terminal device for calculation of downlink channel state information. Here, the channel state information reference signals are transmitted only by bands that are configured by the base station device.

In addition, in FIG. 3, aggregation of plural serving cells (simply referred to as cells also) is supported in the downlink and the uplink (which is referred to as carrier aggregation (CA) or cell aggregation (CA)). Here, in the carrier aggregation, one serving cell is defined as a primary cell (Pcell). Further, in the carrier aggregation, the serving cells other than the primary cell are defined as secondary cells (Scells).

Here, the serving cells may be defined as one serving cell (cell) that is formed with the primary cell with respect to the terminal for which the CA is not configured. Further, the serving cells may be defined as a set of (one or) plural serving cells (cells) that are formed with the primary cell and the secondary cells with respect to the terminal for which the CA is configured.

Here, a carrier that corresponds to the serving cell in the downlink is defined as a downlink component carrier (DLCC). Further, a carrier that corresponds to the primary cell in the downlink is defined as a downlink primary component carrier (DLPCC). Further, a carrier that corresponds to the secondary cell in the downlink is defined as a downlink secondary component carrier (DLSCC).

Further, a carrier that corresponds to the serving cell in the uplink is defined as an uplink component carrier (ULCC). Further, a carrier that corresponds to the primary cell in the uplink is defined as an uplink primary component carrier (ULPCC). Further, a carrier that corresponds to the secondary cell in the uplink is defined as an uplink secondary component carrier (ULSCC).

For example, the primary cell is defined as a cell in which the terminal device performs an initial connection establishment procedure. Further, the primary cell is defined as a cell in which the terminal device starts a connection re-establishment procedure. Further, the primary cell is defined as a cell that is indicated as the primary cell by the base station device in a handover procedure.

That is, the base station device and the terminal device may perform transmission and reception on plural physical channels in a certain subframe. Here, each of the physical channels is mapped to any one of the serving cells. That is, a single physical channel is not mapped to the plural serving cells.

Figure 4:
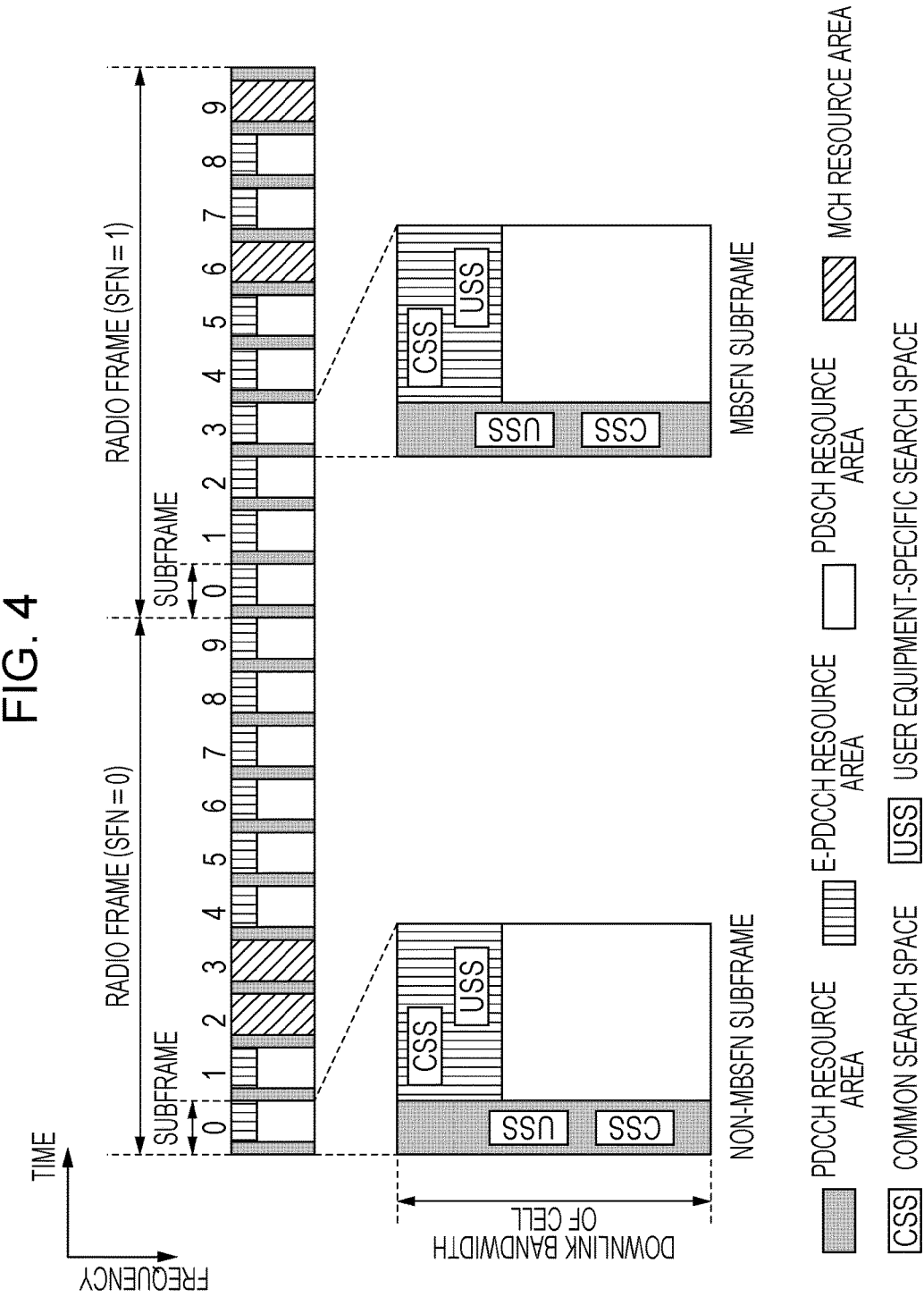
FIG. 4 is a diagram that illustrates an example of mapping of physical downlink channels.

FIG. 4 is a diagram that illustrates an example of mapping of physical downlink channels. FIG. 4 illustrates resource areas of the PDCCHs, resource areas of the E-PDCCHs, resource areas of the PDSCHs, and resource areas of the PMCHs. Further, common search spaces (CSSs) and user equipment-specific search spaces (UE-specific search spaces (USSs)) (terminal-device-specific search spaces) are illustrated.

As illustrated in FIG. 4, the PDSCH is mapped to the OFDM symbols (that may be resource elements for the OFDM symbols) to which the PDCCH is not mapped in the non-MBSFN subframe. Further, the PDSCH is mapped to the OFDM symbols to which the PDCCH is not mapped in the MBSFN subframe.

Further, the PMCH is mapped to the MBSFN area in the MBSFN subframe. Here, a single PMCH is transmitted in a certain subframe.

For example, the PDCCH is mapped to the OFDM symbols of numbers 0, 1, and 2 in the non-MB SFN subframe. Further, for example, the PDCCH is mapped to the OFDM symbols of numbers 0 and 1 in the MBSFN subframe. Here, the PDCCH may be multiplexed with the PDSCH by time division multiplex (TDM).

Here, the base station device may indicate information about the OFDM symbols that are used for transmission of the PDCCH in a certain subframe to the terminal device by using a physical control format indicator channel (PDFICH). Further, the PDCCH may be transmitted by using the antenna port that is the same as the antenna port used for transmission of the cell-specific reference signals.

Further, the E-PDCCH is mapped to the OFDM symbols to which the PDCCH is not mapped in a certain subframe. Further, the E-PDCCH may be multiplexed with the PDSCH by frequency division multiplex (FDM).

Here, for example, the base station device may configure the resource area of the E-PDCCH for the terminal device by using the higher layer signaling. Further, the E-PDCCH may be transmitted by using the antenna port that is the same as or different from the antenna port used for transmission of the user equipment-specific reference signals that are associated with the PDSCH. Here, the user equipment-specific reference signals may be shared by plural terminal devices. Hereinafter, the E-PDCCH is basically included in the PDCCH.

Here, plural formats (downlink control information (DCI) formats) are defined for the downlink control information that is transmitted on the PDCCH and/or the E-PDCCH.

For example, a DCI format 1A that is used for scheduling of a single PDSCH in a single cell (transmission of a single PDSCH codeword and a single downlink transport block) is defined as the DCI format for the downlink.

Further, a DCI format 2 (that may be a DCI format 2C) that is used for scheduling of a single PDSCH in a single cell (transmission of two or less PDSCH codewords and two or less downlink transport blocks) is defined as the DCI format for the downlink.

Further, for example, a DCI format (DCI format X) that is used for scheduling for the multi-cell communication is defined as the DCI format for the downlink.

For example, the DCI format for the downlink includes the downlink control information such as information about resource allocation for the PDSCH and information about a modulation and coding scheme (MCS). Hereinafter, the DCI format that is used for the scheduling of the PDSCH will also be denoted as downlink assignment.

Further, for example, a DCI format 0 that is used for scheduling of a single physical uplink shared channel (PUSCH) in a single cell (transmission of a single PUSCH codeword and a single uplink transport block) is defined as the DCI format for the uplink.

Further, a DCI format 4 that is used for scheduling of a single PUSCH in a single cell (transmission of two or less PUSCH codewords and two or less uplink transport block) is defined as the DCI format for the uplink.

Further, for example, a DCI format (DCI format Y) that is used for scheduling for the multi-cell communication may be defined as the DCI format for the uplink.

For example, the DCI format for the uplink includes the downlink control information such as information about resource allocation for the PUSCH and information about the modulation and coding scheme (MCS). Hereinafter, the DCI format that is used for the scheduling of the PUSCH will also be denoted as uplink grant.

Further, the terminal device monitors a set of PDCCH candidates. Here, the PDCCH candidate means a candidate to which the PDCCH may be mapped and on which the PDCCH may be transmitted by the base station device. Further, the PDCCH candidate is configured with a single or plural control channel elements (CCEs). Further, monitoring means that the terminal device attempts to decode each of the PDCCHs in the set of PDCCH candidates in accordance with all the DCI formats that are monitored.

Further, the terminal device monitors a set of E-PDCCH candidates. Here, the E-PDCCH candidate means a candidate to which the E-PDCCH may be mapped or on which the E-PDCCH may be transmitted by the base station device. Further, the E-PDCCH candidate is configured with a single or plural enhanced control channel elements (E-CCEs). Further, monitoring means that the terminal device attempts to decode each of the E-PDCCHs in the set of E-PDCCH candidates in accordance with all the DCI formats that are monitored.

Here, the set of PDCCH candidates and/or the set of E-PDCCH candidates that are monitored by the terminal device are also referred to as a search space. That is, the search space is a set of resources that may be used by the base station device for transmission of the PDCCH and/or transmission of the E-PDCCH.

That is, the CSS and/or the USS are configured (defined or set) in the resource area of the PDCCH. Further, the CSS and/or the USS are configured (defined or set) in the resource area of the E-PDCCH.

The base station device transmits (allocates) the PDCCH in the CSS and/or the USS in the resource area of the PDCCH. Further, the base station device transmits (allocates) the E-PDCCH in the CSS and/or the USS in the resource area of the E-PDCCH.

Further, the terminal device monitors the PDCCH in the CSS and/or the USS in the resource area of the PDCCH and detects the PDCCH addressed to the own device. Further, the terminal device monitors the E-PDCCH in the CSS and/or the USS in the resource area of the E-PDCCH and detects the E-PDCCH addressed to the own device.

Here, the CSS is used for transmission of the downlink control information to plural terminal devices. That is, the CSS is defined as common resources with respect to the plural terminal devices. For example, the CSSs are configured with the CCEs of predetermined numbers (for example, the CCEs of indices 0 to 15) between the base station device and the terminal devices.

Further, the CSS may be used for transmission of the downlink control information to a specified terminal device. That is, the base station device may transmit the DCI format for the plural terminal devices as targets and/or the DCI format for a specified terminal device as a target in the CSS.

Further, the USS is used for transmission of the downlink control information to a specified terminal device. That is, the USS is defined as dedicated resources with respect to a certain terminal device. That is, the USS is independently defined with respect to the respective terminal devices. For example, the USS is configured with the CCE of a number that is determined based on a radio network temporary identifier (RNTI) that is assigned by the base station device, a slot number in the radio frame, an aggregation level, and so forth. That is, the base station device transmits the DCI format for a specified terminal device as a target in the USS.

Here, the RNTI that is assigned to the terminal device by the base station device is used for transmission of the downlink control information (transmission on the PDCCH or transmission on the E-PDCCH). Specifically, the cyclic redundancy check (CRC) parity bits (simply referred to as CRCs also) that are generated based on the downlink control information (that may be the DCI format) are attached to the downlink control information. After the attachment, the CRC parity bits are scrambled by the RNTI.

That is, the terminal device attempts to decode the PDCCH (that may be the E-PDCCH, the downlink control information, or the DCI formats) with the CRC parity bits that are scrambled by the RNTI and detects the PDCCH with which the CRC is successful as the PDCCH addressed to the own device (also referred to as blind decoding).

Here, the RNTI includes a cell RNTI (C-RNTI). Further, the RNTI includes a random access RNTI (RA-RNTI). Further, the RNTI includes a paging RNTI (P-RNTI). Further, the RNTI includes a system information RNTI (SI-RNTI).

Here, the C-RNTI is a unique identifier that is used for identification of radio resource control (RRC) connection and scheduling. For example, the C-RNTI is used for unicast transmission that is dynamically scheduled.

Further, the RA-RNTI is an identifier that is used in a case where a random access response message is transmitted in a random access procedure. For example, the terminal device monitors the PDCCH with the CRC scrambled by the RA-RNTI in a case where a random access preamble is transmitted.

For example, the terminal device executes the random access procedure for initial connection establishment. Further, the terminal device executes the random access procedure for the handover. Further, the terminal device executes the random access procedure for connection re-establishment. Further, the terminal device executes the random access procedure to request a resource for a UL-SCH.

Further, the P-RNTI is an identifier that is used for paging and notification of system information. Further, the SI-RNTI is an identifier that is used for broadcasting the system information.

Here, the PDCCH with the CRC scrambled by the C-RNTI may be transmitted in the USS or the CSS. Further, the PDCCH with the CRC scrambled by the RA-RNTI may be transmitted only in the CSS. Further, the PDCCH with the CRC scrambled by the P-RNTI may be transmitted only in the CSS. Further, the PDCCH with the CRC scrambled by the SI-RNTI may be transmitted only in the CSS.

That is, the terminal device changes an interpretation of the downlink control information based on by which RNTI the CRC is scrambled. Further, the terminal device receives the downlink data on the PDSCH that is scheduled by using the downlink control information transmitted on the PDCCH. Hereinafter, the transmission of the downlink data on the PDSCH will also be denoted as transmission of the PDSCH. Further, the reception of the downlink data on the PDSCH will also be denoted as reception of the PDSCH.

Further, the base station device and the terminal device transmit and receive signals in the higher layers. For example, the base station device and the terminal device transmit and receive a radio resource control signal (RRC signaling) (also referred to as a radio resource control (RRC) message or a radio resource control (RRC) information) in an RRC layer (layer 3).

Here, a dedicated signal that is transmitted to a certain terminal device by the base station device in the RRC layer is also referred to as dedicated signal. That is, a dedicated (specific) configuration (information) for a certain terminal device is transmitted by using the dedicated signal by the base station device. Hereinafter, the dedicated signals are included in the RRC signaling.

Further, the base station device and the terminal device transmit and receive a MAC control element in a medium access control (MAC) layer (layer 2). Here, the RRC signaling and/or the MAC control element are also referred to as higher layer signaling.

Figure 5:
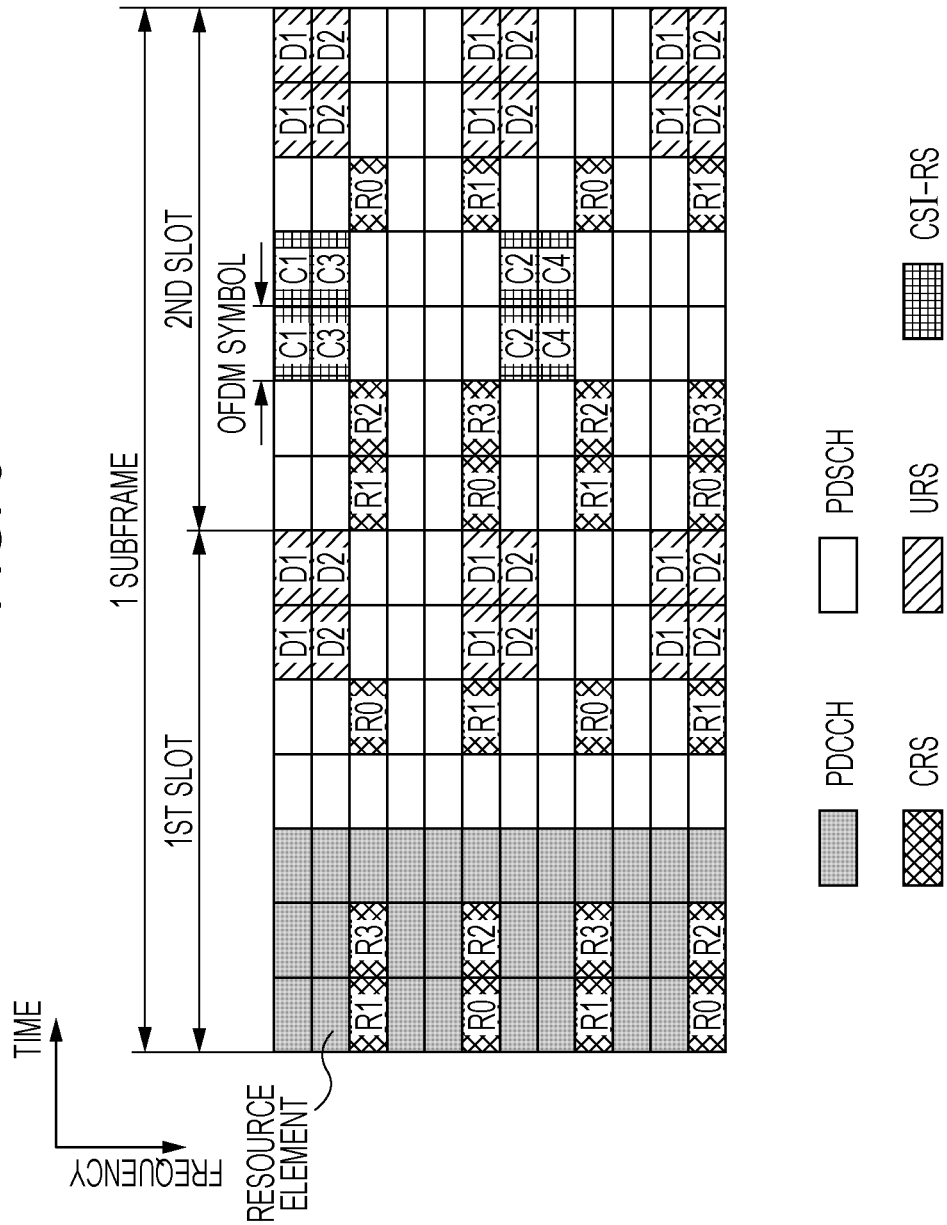
FIG. 5 is a diagram that illustrates an example of mapping of a physical downlink shared channel and downlink reference signals.

FIG. 5 is a diagram that illustrates an example of mapping of the PDSCH and the downlink reference signals. FIG. 5 illustrates an example of mapping of the downlink reference signals in the non-MB SFN subframe. Here, FIG. 5 illustrates two resource blocks (also referred to as resource block pair) in one subframe. For example, 1 resource block is configured with 12 subcarriers in the frequency domain and with 7 OFDM symbols in the time domain.

Here, each of the seven OFDM symbols in the time domain in one subframe is also referred to as slot. That is, one subframe is configured with a first slot and a second slot. Further, a resource (a minimum time-frequency configuration unit) that is defined by one OFDM symbol and one subcarrier in one slot is also referred to as a resource element. That is, the PDSCH is mapped to the resource elements. Further, the downlink reference signals are mapped to the resource elements.

Here, in FIG. 5, Ri represents the resource elements to which the cell-specific reference signals for an antenna port i are mapped (or which are used for transmission of the cell-specific reference signals) (for example, i=0, 1, 2, 3).

Further, Di represents the resource elements to which the user equipment-specific reference signals for a DMRS group i are mapped (which are used for transmission of the user equipment-specific reference signals) (for example, i=1, 2).

Here, for example, the antenna ports of the user equipment-specific reference signals that are associated with the PDSCH are 7 to 14. Further, for example, the antenna ports of the user equipment-specific reference signals that are associated with the E-PDCCH are 107 to 110. Further, the user equipment-specific reference signal for each of the antenna ports is generated with an orthogonal code sequence with a code length of two or four and is mapped to the resource element of any of the DMRS groups.

Further, Ci represents the resource elements to which the channel state information reference signals for a CSI-RS group i are mapped (which are used for transmission of the channel state information reference signals) (for example, i=1, 2, 3, 4).

Here, for example, the antenna ports of the channel state information reference signals are 15 to 22. Further, the channel state information reference signal for each of the antenna ports is generated with the orthogonal code sequence with a code length of two and is mapped to the resource element of any of the CSI-RS groups.

Figure 6:
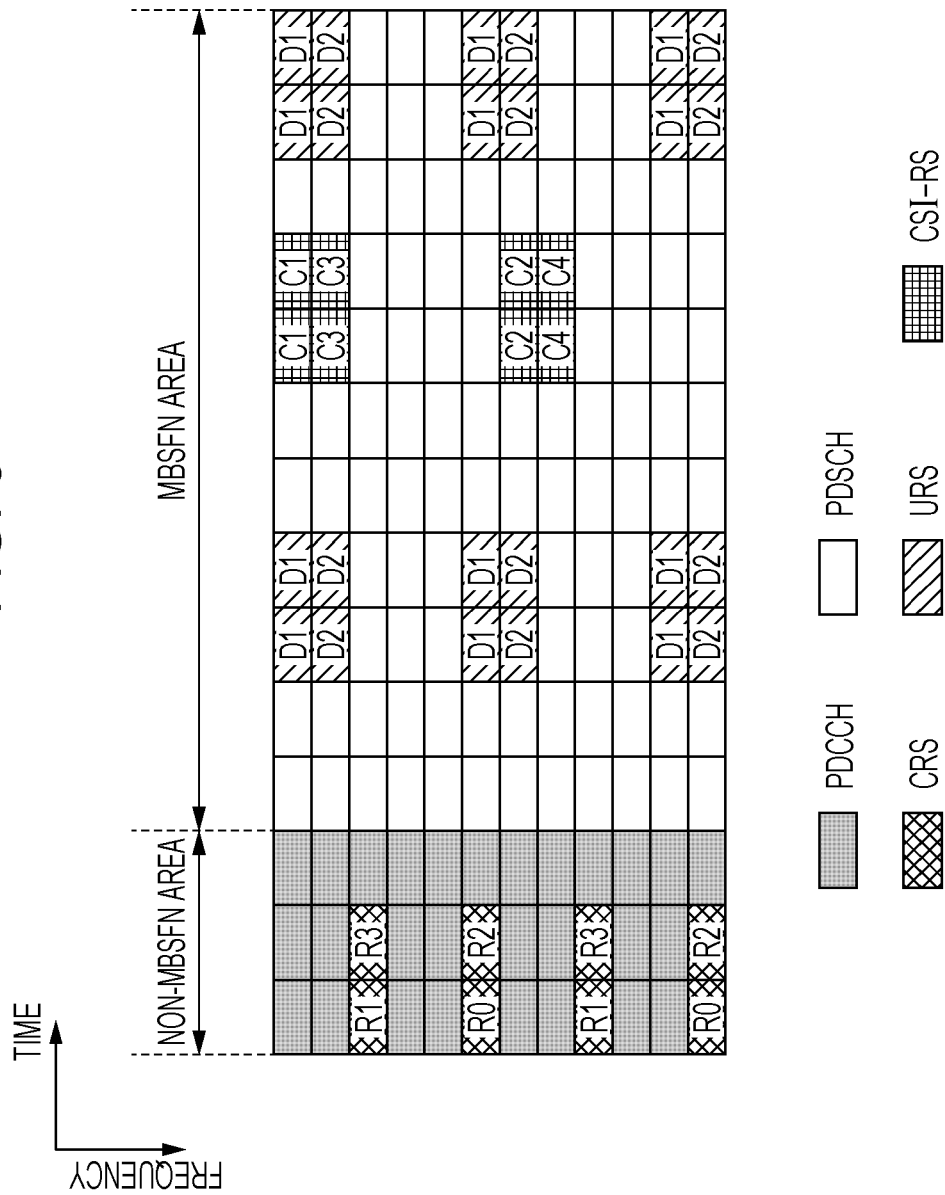
FIG. 6 is another diagram that illustrates an example of mapping of the physical downlink shared channel and the downlink reference signals.

FIG. 6 is another diagram that illustrates an example of mapping of the PDSCH and the downlink reference signals. FIG. 6 illustrates an example of mapping of the downlink reference signals in the MBSFN subframe.

As illustrated in FIG. 6, in a certain MBSFN subframe, the cell-specific reference signals are not transmitted in the MBSFN area in the MBSFN subframe. That is, in a certain MBSFN subframe, the cell-specific reference signals are transmitted only in the non-MBSFN area in the MBSFN subframe.

For example, the user equipment-specific reference signals are transmitted in the MBSFN area in a certain MBSFN subframe. Further, the MBSFN reference signals are transmitted in the MBSFN area in a certain MBSFN subframe in a case where the PMCH is transmitted.

Figure 7:
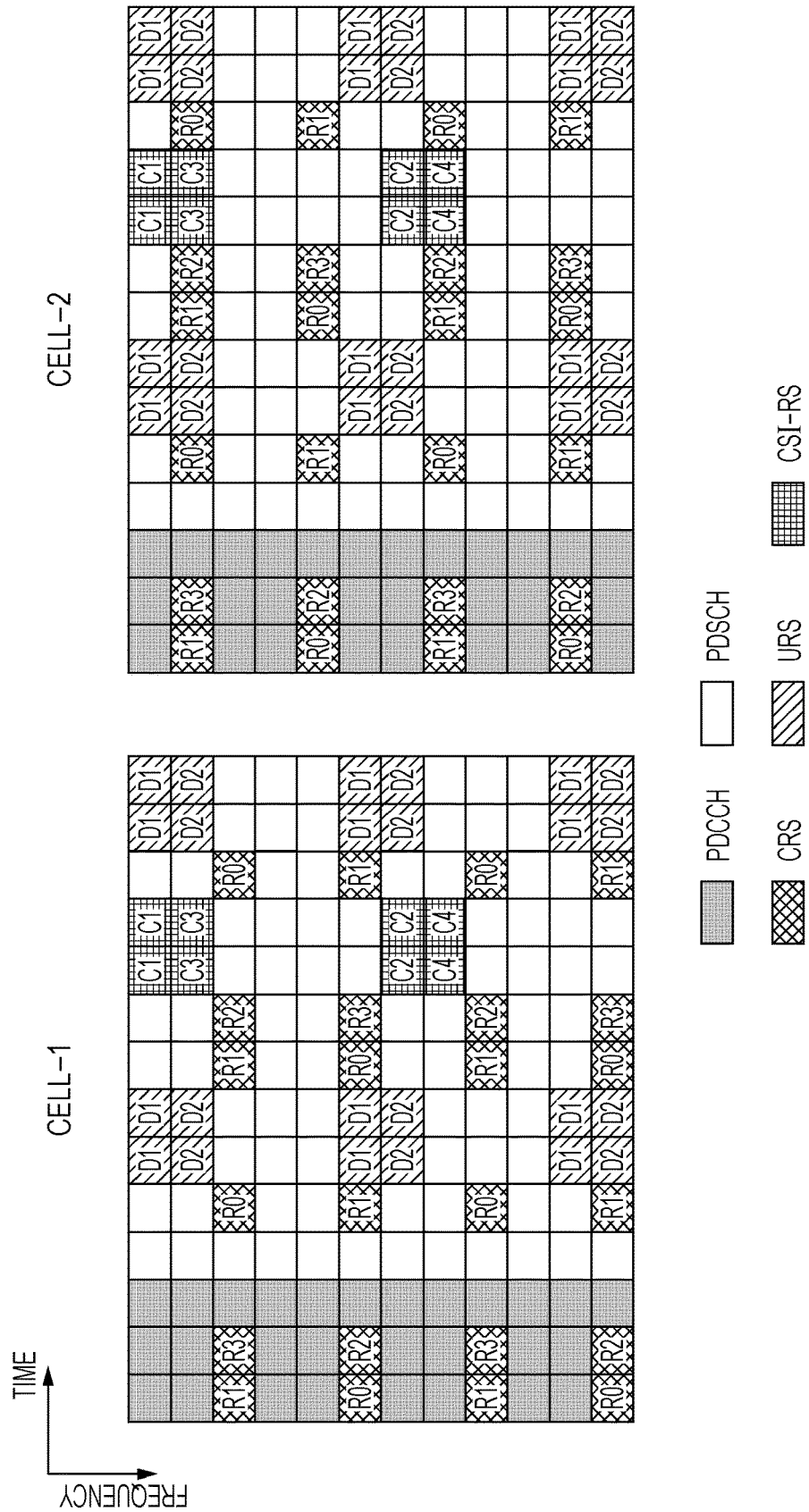
FIG. 7 is still another diagram that illustrates an example of mapping of the physical downlink shared channel and the downlink reference signals.

FIG. 7 is another diagram that illustrates an example of mapping of the PDSCH and the downlink reference signals. Here, FIG. 7 illustrates an example of mapping of the downlink reference signals that are transmitted in each of two cells.

Here, the left side of FIG. 7 illustrates an example of mapping of the downlink reference signals that are transmitted in a certain cell (cell 1). Further, the right side of FIG. 7 illustrates an example of mapping of the downlink reference signals that are transmitted in a cell (cell 2) with the physical layer cell identity that is different from the physical layer cell identity of the cell 1. Here, for example, the cell 2 that is indicated on the right side of FIG. 7 may be considered as a neighboring cell (also referred to as other cell, coordinated cell, or associated cell) of the cell 1.

For example, the terminal device may assume (identify and recognize) each of the downlink reference signals that are illustrated in FIG. 7. That is, for example, the terminal device receives the PDSCHs based on the respective positions of two cell-specific reference signals.

Here, the positions of the cell-specific reference signals (hereinafter denoted as CRS positions also) is determined (calculated) based on the physical layer cell identity (a value of the physical layer cell identity). Here, the positions of the cell-specific reference signals are also denoted as the resource elements (the positions of the resource elements) to which the cell-specific reference signals are mapped.

For example, the positions of the cell-specific reference signals in the cell 1 are determined based on the physical layer cell identity of the cell 1. Further, the positions of the cell-specific reference signals in the cell 2 are determined based on the physical layer cell identity of the cell 2. That is, as illustrated in FIG. 7, the cell-specific reference signals are mapped to different positions with respect to the cells (cell 1 and cell 2) with the different physical layer cell identities.

For example, the positions of the cell-specific reference signals are determined by specifying the positions of the resource elements to which the cell-specific reference signals are mapped based on the physical layer cell identity. Further, for example, the positions of the cell-specific reference signals are shifted in the frequency direction based on the physical layer cell identity. Further, for example, the positions of the cell-specific reference signals are determined in three patterns with respect to the frequency direction based on the physical layer cell identity.

Here, for example, the terminal device may detect the physical layer cell identity by using synchronization signals. Further, the terminal device may obtain the physical layer cell identity from information that is included in the higher layer signaling (for example, a handover command) that is transmitted by the base station device.

Figure 8:
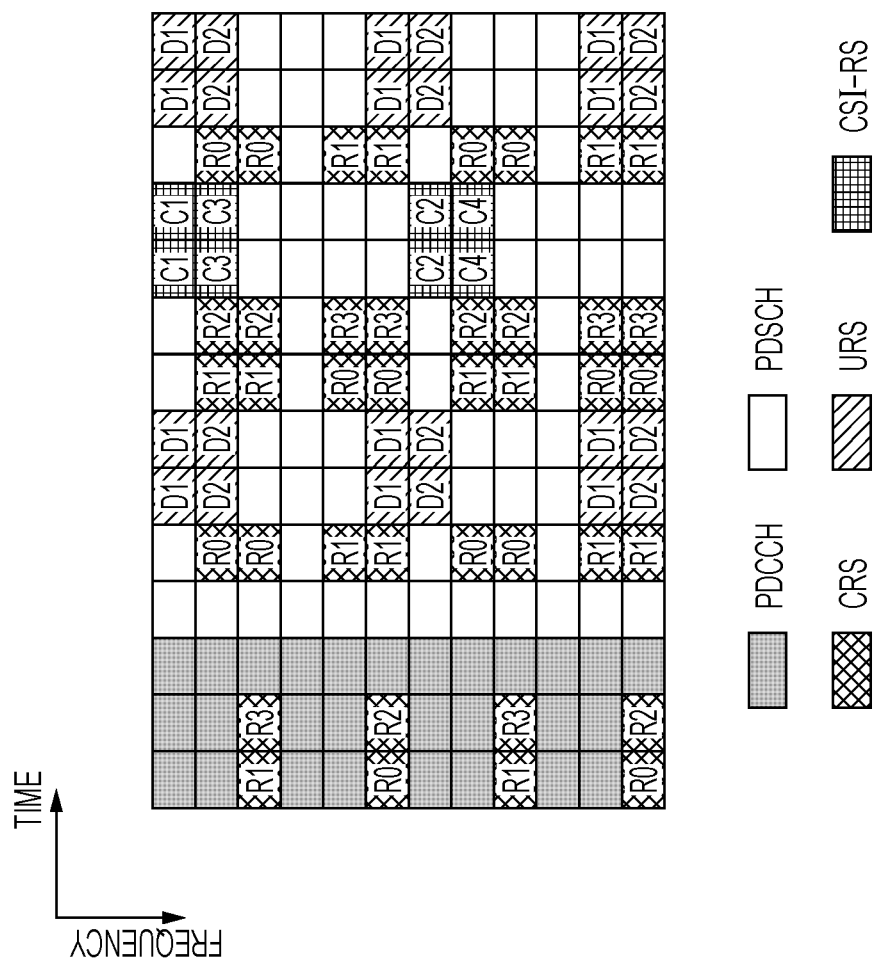
FIG. 8 is yet another diagram that illustrates an example of mapping of the physical downlink shared channel and the downlink reference signals.

FIG. 8 is another diagram that illustrates an example of mapping of the PDSCH and the downlink reference signals. Here, FIG. 8 illustrates an example of mapping of the downlink reference signals that are transmitted from the two cells. Further, the cell 1 and the cell 2 that are illustrated in FIG. 8 correspond to FIG. 7. For example, the terminal device may assume (identify and recognize) the downlink reference signals that are illustrated in FIG. 8 in a case where the multi-cell communication is performed by the cell 1 and the cell 2. That is, the terminal device receives the PDSCH based on the positions of two cell-specific reference signals.

Here, in a case where physical signals or physical channels (for example, cell-specific reference signals or the like) other than the PDSCH are mapped to the resource elements when the PDSCH is mapped to the resource element, the rate-matching is performed for the PDCCH with respect to the resource elements to which the physical signals or physical channels are mapped.

Here, the rate-matching means a process in which the PDSCH is mapped while avoiding the resource elements to which physical signals or physical channels other than the PDSCH are mapped. For example, a process different from the rate-matching may be puncturing (puncturing process) in which a physical signal or physical channel other than the PDSCH is mapped by overwriting the physical signal or physical channel to the resource element to which the PDSCH is mapped.

That is, the PDSCH is mapped to the resource elements except the resource elements to which the physical signals or physical channels other than the PDSCH are mapped. That is, the PDSCH is mapped to the resource elements that are not used for the physical signals or physical channels other than the PDSCH.

Here, in a case where the terminal device receives the PDSCH without assuming that the rate-matching is performed by the base station device and transmission on the PDSCH is performed, reception performance for the PDSCH degrades. Thus, in order to avoid degradation of the reception performance for the PDSCH, the base station device and the terminal device preferably perform transmission and reception on the PDSCH based on the resource elements to which the physical signals or physical channels other than the PDSCH are mapped.

Here, to simplify the description, FIGS. 7 and 8 illustrate an operation (process) of the base station device and the terminal device based on the two cell-specific reference signals. However, it is matter of course that similar embodiments are applicable regardless of the number of the cell-specific reference signals.

For example, the base station device may perform the rate-matching for the PDSCH based on the positions of three cell-specific reference signals. Further, the terminal device may receive the PDSCH based on the positions of three cell-specific reference signals.

Here, the base station device may indicate (configure or specify) the positions of the cell-specific reference signals for the terminal. For example, the base station device may independently indicate the respective positions of one or more cell-specific reference signals (for example, the respective positions of three cell-specific reference signals). That is, the base station device may indicate the resource elements (the positions of the resource elements) that are available for transmission of the PDSCH for the terminal device.

Here, for example, the positions of the cell-specific reference signals may be determined based on a frequency shift (positions in the frequency direction) of the cell-specific reference signals. As described above, the frequency shift of the cell-specific reference signals is determined based on the physical layer cell identity. Further, the positions of the cell-specific reference signals may be determined based on the number of ports that are used for transmission of the cell-specific reference signals. Further, presence or absence of the cell-specific reference signals may be determined based on whether or not the subframe is the MBSFN subframe.

That is, the base station device transmits information that indicates the frequency shift of the cell-specific reference signals (for example, information about the physical layer cell identity) and may thereby indicate the positions of the cell-specific reference signals. Further, the base station device transmits information that indicates the number of the ports of the cell-specific reference signals and may thereby indicate the positions of the cell-specific reference signals.

Further, the base station device transmits information that indicates the subframe in which the cell-specific reference signals is transmitted (for example, information about the MBSFN subframe) and may thereby indicate presence or absence of the cell-specific reference signals.

Hereinafter, the information that indicates the frequency shift of the cell-specific reference signals, and/or the information that indicates the number of the ports of the cell-specific reference signals, and/or the information that indicates the subframe in which the cell-specific reference signals is transmitted are also denoted as information that indicates the positions of the cell-specific reference signals.

For example, the base station device may transmit the higher layer signaling (that may also be the dedicated signals) that includes the information that indicates the positions of the cell-specific reference signals. That is, the base station device may configure a set of the positions of the resource elements to which the cell-specific reference signals are mapped.

Further, the base station may use the higher layer signaling (that may be the dedicated signal) to configure a plurality of sets of the positions of the cell-specific reference signals and may further use the PDCCH to indicate one or a plurality of positions of the cell-specific reference signals from the configured plurality of positions of the cell-specific reference signals.

Further, the base station may use the higher layer signaling (that may be the dedicated signals) to configure a plurality of sets of the positions of the cell-specific reference signals and may further use the PDCCH to indicate whether the configuration is valid or invalid.

That is, the base station device may transmit on the PDCCH, the DCI format (for example, the downlink assignment) that includes the downlink control information about the positions of the cell-specific reference signals (hereinafter referred to as first control information also) to the terminal device. For example, a field of two bits (or a field of three bits) that is defined in the DCI format is mapped to the first control information.

For example, in a case where the field of two bits that is defined in the DCI format is mapped to the first control information, three states among four states may be used to indicate the positions of the cell-specific reference signals (for example, "01: set 1 of the positions of the cell-specific reference signals", "10: set 2 of the positions of the cell-specific reference signals", and "11: set 3 of the positions of the cell-specific reference signals").

In this case, the base station device may use one remaining state to indicate the positions of the cell-specific reference signals of the serving cell (that is, using the positions of the cell-specific reference signal that are determined based on the physical layer cell identity) (for example, "00: the positions of the cell-specific reference signals of the serving cell").

Further, in a case where the field of three bits that is defined in the DCI format is mapped to the information about the positions of the cell-specific reference signals, the (three) positions of the cell-specific reference signals may be indicated by using a bitmap format. That is, a combination of the three positions of the cell-specific reference signals are made correspond to the bits of the field of three bits, thereby enabling indication of the combination of the three positions of the cell-specific reference signals.

Here, for example, the first control information may be included in the DCI format other than a predetermined DCI format. That is, the first control information may not be included in the predetermined DCI format. For example, the first control information may not be included in the DCI format 1A. Here, the DCI format (the predetermined DCI format) that may include the first control information is defined in advance by a specification or the like.

Further, the first control information may be included in the DCI format in a case where the DCI format is transmitted in the USS. That is, the first control information may not be included in the DCI format in a case where the DCI format is transmitted in the CSS.

For example, the first control information may be included in the DCI format 1A in a case where the DCI format 1A is transmitted in the USS. Further, the first control information may not be included in the DCI format 1A in a case where the DCI format 1A is transmitted in the CSS.

Further, the first control information may be included in the DCI format that is transmitted only in the USS. That is, the first control information may not be included in the DCI format that is transmitted in the CSS.

Further, the first control information may be included in the DCI format in a case where the DCI format is transmitted on the PDCCH with the CRC scrambled by the C-RNTI. That is, the first control information may not be included in the DCI format in a case where the DCI format is transmitted on the PDCCH with the CRC scrambled by the RA-RNTI. Further, the first control information may not be included in the DCI format in a case where the DCI format is transmitted on the PDCCH with the CRC scrambled by the P-RNTI. Further, the first control information may not be included in the DCI format in a case where the DCI format is transmitted on the PDCCH with the CRC scrambled by the SI-RNTI.

Further, the first control information may be included in the DCI format only in a case where such a configuration is made by the base station device. For example, the base station device may transmit information about whether or not first control information is included in the DCI format by using the higher layer signaling (that may also be the dedicated signals).

Further, the first control information may be included in the DCI format only in a case where such a predetermined transmission mode (for example, a transmission mode for the PDSCH) is configured by the base station device. For example, the base station device may transmit the DCI format that includes the first control information only in a case where the predetermined transmission mode is configured. Here, the predetermined transmission mode is defined in advance by a specification or the like.

Here, for example, the terminal may determine (assume) the positions of the cell-specific reference signals even in a case where information about the frequency shift of the cell-specific reference signal is not transmitted.

For example, the terminal device may determine the positions of the cell-specific reference signals while assuming that the cell-specific reference signals are mapped to all the resource elements to which the cell-specific reference signals may be mapped. Further, the terminal device may determine the positions of the cell-specific reference signals while assuming that the cell-specific reference signals are mapped to all the resource elements to which the cell-specific reference signals may be mapped except the resource elements to which the cell-specific reference signals of the serving cells are mapped. Further, the terminal device may determine the positions of the cell-specific reference signals while assuming that the respective positions of plural cell-specific reference signals are the same as the positions of the cell-specific reference signals of the serving cells.

Here, a manner of how the terminal device makes an assumption about the resource elements to which the cell-specific reference signals are mapped is defined in advance by a specification document or the like.

Further, the terminal device may determine (assume) the positions of the cell-specific reference signals even in a case where information about the number of the ports of the cell-specific reference signals is not transmitted.

For example, the terminal device may determine the positions of the cell-specific reference signals while assuming the number of the ports that are used for the cell-specific reference signal. For example, the terminal device may determine the positions of the cell-specific reference signals while assuming that the number of the ports that are used for transmission of the cell-specific reference signals is any of one port, two ports, and four ports. Further, the terminal device may determine the positions of the cell-specific reference signals while assuming that the number of the ports that are used for transmission of the respective cell-specific reference signals of plural cells are the same as the number of the ports that are used for transmission of the cell-specific reference signals of the serving cells.

Here, a manner of how the terminal device makes an assumption about the number of the ports that are used for transmission of the cell-specific reference signals is defined in advance by a specification document or the like.

Further, the terminal device may determine (assume) the positions of the cell-specific reference signals even in a case where information that indicates the subframe in which the cell-specific reference signals is transmitted is not transmitted.

For example, the terminal device may determine the positions of the cell-specific reference signals while assuming that the cell-specific reference signals are transmitted in all the subframes. Further, the terminal device may determine the positions of the cell-specific reference signals while assuming that the subframes in which the respective cell-specific reference signals of plural cells are transmitted are the same as the subframes in which the cell-specific reference signals of the serving cells are transmitted.

Here, a manner of how the terminal device makes an assumption about the subframes in which the cell-specific reference signals are transmitted is defined in advance by a specification document or the like.

As described above, the base station device performs the rate-matching based only on the positions of the cell-specific reference signals that are determined in accordance with the physical layer cell identity of the serving cell and transmits the PDSCH (hereinafter denoted as transmission on the PDSCH based on the PCI also).

For example, as illustrated on the left side of FIG. 7, the base station device performs the rate-matching based only on the positions of the cell-specific reference signals that are determined in accordance with the physical layer cell identity of the cell 1 and transmits the PDSCH. Further, as illustrated on the right side of FIG. 7, the base station device performs the rate-matching based only on the positions of the cell-specific reference signals that are determined in accordance with the physical layer cell identity of the cell 2 and transmits the PDSCH.

Further, the base station device performs the rate-matching based on the positions of the cell-specific reference signals that are indicated by using a user-equipment specific configuration (also denoted as a dedicated (specific) configuration for a certain terminal device) and transmits the PDSCH (hereinafter denoted as transmission on the PDSCH based on a first configuration also).

For example, as illustrated in FIG. 8, the base station device performs the rate-matching based on the positions of the two cell-specific reference signals and transmits the PDSCH. For example, the base station device performs the rate-matching based on the positions of the cell-specific reference signals that are transmitted in the cell 1 and the positions of the cell-specific reference signals that is transmitted in the cell 2 and transmits the PDSCH.

Here, the base station device may perform the rate-matching based on the positions of the cell-specific reference signals that are determined in accordance with the physical layer cell identity of the serving cell and the positions of the cell-specific reference signals that are indicated for the terminal device and may transmit the PDSCH. That is, the base station device may perform the rate-matching based on the positions of the cell-specific reference signals that are indicated for the terminal device in addition to the positions of the cell-specific reference signals that is determined in accordance with the physical layer cell identity of the serving cell and may transmit the PDSCH.

Hereinafter, to simplify the description, a case where the rate-matching is performed based on the positions of the cell-specific reference signals that are indicated for the terminal device and transmission on the PDSCH is performed will be described as transmission on the PDSCH based on the first configuration.

However, the transmission on the PDSCH based on the first configuration includes a case where the rate-matching is performed based on the positions of the cell-specific reference signals that are indicated for the terminal device in addition to the positions of the cell-specific reference signals that are determined in accordance with the physical layer cell identity of the serving cell and transmission on the PDSCH is performed. That is, the transmission on the PDSCH based on the first configuration includes at least a case where the rate-matching is performed based on the positions of the cell-specific reference signals that are indicated for the terminal device and transmission on the PDSCH is performed.

Further, the terminal device receives the PDSCH while assuming that the rate-matching is performed based only on the positions of the cell-specific reference signals that are determined in accordance with the physical layer cell identity of the serving cell (which will hereinafter be denoted as reception on the PDSCH based on the PCI also).

For example, as illustrated on the left side of FIG. 7, the terminal device receives the PDSCH while assuming that the rate-matching is performed based only on the positions of the cell-specific reference signals that are determined in accordance with the physical layer cell identity of the cell 1. Further, as illustrated on the right side of FIG. 7, the terminal device receives the PDSCH while assuming that the rate-matching is performed based only on the positions of the cell-specific reference signals that are determined in accordance with the physical layer cell identity of the cell 2.

Further, the terminal device receives the PDSCH while assuming that the rate-matching is performed based only on the positions of the cell-specific reference signals that are indicated by using the user-equipment specific configuration (which will hereinafter be referred to as reception on the PDSCH based on the first configuration).

For example, as illustrated in FIG. 8, the terminal device receives the PDSCH while assuming that the rate-matching is performed based on the positions of the two cell-specific reference signals. For example, the terminal device receives the PDSCH while assuming that the rate-matching is performed based on the positions of the cell-specific reference signals that are transmitted in the cell 1 and the positions of the cell-specific reference signals that are transmitted in the cell 2.

Here, the terminal device may receive the PDSCH while assuming that the rate-matching is performed based on the positions of the cell-specific reference signals that are determined in accordance with the physical layer cell identity of the serving cell and the positions of the cell-specific reference signals that are indicated by the base station. That is, the terminal device may receive the PDSCH while assuming that the rate-matching is performed based on the positions of the cell-specific reference signals that are indicated by the base station device in addition to the positions of the cell-specific reference signals that are determined in accordance with the physical layer cell identity of the serving cell.

Hereinafter, to simplify the description, a case where reception on the PDSCH is performed on an assumption that the rate-matching is performed based on the positions of the cell-specific reference signals that are indicated by the base station device will be described as reception on the PDSCH based on the first configuration.

However, the reception on the PDSCH based on the first configuration includes a case where the reception on the PDSCH is performed on an assumption that the rate-matching is performed based on the positions of the cell-specific reference signals that are indicated by the base station device in addition to the positions of the cell-specific reference signals that are determined in accordance with the physical layer cell identity of the serving cell. That is, the reception on the PDSCH based on the first configuration includes at least a case where reception on the PDSCH is performed on an assumption that the rate-matching is performed based on the positions of the cell-specific reference signals that are indicated by the base station device.

Figure 9:
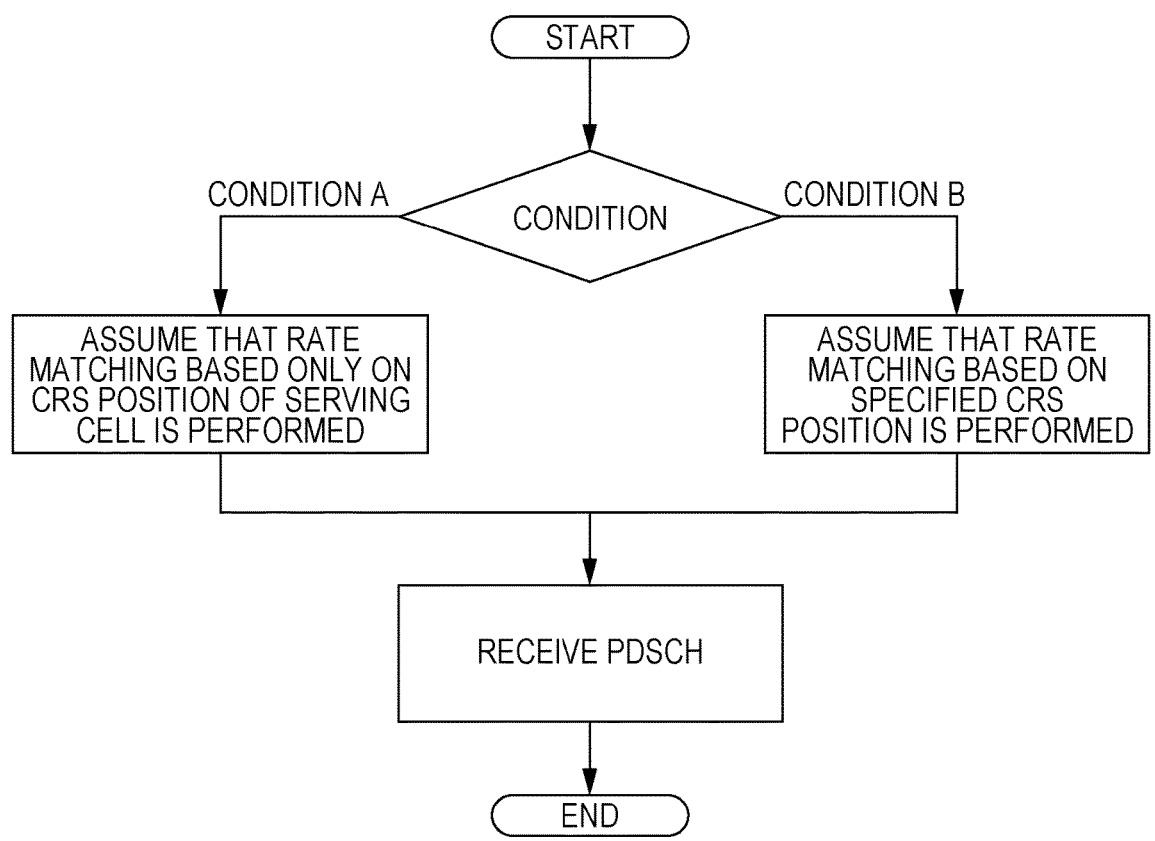
FIG. 9 is a diagram that illustrates an example of a processing flow according to this embodiment.

FIG. 9 is a diagram that illustrates an example of a flow according to this embodiment. As illustrated in FIG. 9, the base station device switches, based on a condition, between the transmission on the PDSCH based on the PCI and the transmission on the PDSCH based on the first configuration. Further, the terminal device switches between the reception on the PDSCH based on the PCI and the reception on the PDSCH based on the first configuration.

That is, in a case of a condition A, the base station device performs the rate-matching based only on the positions of the cell-specific reference signals that are determined in accordance with the physical layer cell identity of the serving cell and performs transmission on the PDSCH.

That is, for example, in the case of the condition A, the base station device maps the PDSCH to the resource elements in the physical resource blocks that are allocated for transmission on the PDSCH. Further, in the case of the condition A, the base station device maps the PDSCH to the resource elements that are not used for transmission of the cell-specific reference signals.

Further, in a case of a condition B, the base station device performs the rate-matching based on the positions of the cell-specific reference signals that are indicated for the terminal device and performs transmission on the PDSCH.

That is, for example, in the case of the condition B, the base station device maps the PDSCH to the resource elements in the physical resource blocks that are allocated for transmission on the PDSCH except the resource elements that are indicated for the terminal device. Further, in the case of the condition B, the base station device maps the PDSCH to the resource elements that are not used for transmission of the cell-specific reference signal.

Further, in the case of the condition A, the terminal device performs reception on the PDSCH while assuming that the rate-matching is performed based only on the positions of the cell-specific reference signals that are determined in accordance with the physical layer cell identity of the serving cell.

That is, in the case of the condition A, the terminal device receives the PDSCH that is mapped to the resource elements in the physical resource blocks that are allocated for transmission on the PDSCH. Further, in the case of the condition A, the terminal device receives the PDSCH that is mapped to the resource elements that are not used for transmission of the cell-specific reference signals.

Further, in the case of the condition B, the terminal device receives the PDSCH while assuming that the rate-matching is performed based on the positions of the cell-specific reference signals that are indicated by the base station device.

That is, in the case of the condition B, the terminal device receives the PDSCH that is mapped to the resource element in the physical resource blocks that are allocated for transmission on the PDSCH except the resource elements that are indicated (specified or configured) by the base station device. That is, in the case of the condition B, the terminal device receives the PDSCH that is mapped to the resource elements that are not used for transmission of the cell-specific reference signal.

Here, the condition A includes transmission (allocation) of the PDCCH in the CSS. Further, the condition A includes detection (decoding or reception) of the PDCCH in the CSS.

That is, in a case where the PDCCH is transmitted (that may be allocated) in the CSS, the base station device performs the transmission on the PDSCH based on the PCI. Further, in a case where the PDCCH is detected in the CSS, the terminal device performs the reception on the PDSCH based on the PCI.

Further, the condition B includes transmission (allocation) of the PDCCH in the USS. Further, the condition B includes detection (decoding or reception) of the PDCCH in the USS.

That is, in a case where the PDCCH is transmitted in the USS, the base station device performs the transmission on the PDSCH based on the first configuration. Further, in a case where the PDCCH is detected in the USS, the terminal device performs the reception on the PDSCH based on the first condition.

Further, the condition A includes transmission of a predetermined DCI format (hereinafter denoted as a first DCI format also). Further, the condition A includes detection (decoding or reception) of the predetermined DCI format. Here, the first DCI format is defined in advance by a specification or the like and may be provided as known information between the base station device and the terminal device.

Here, for example, the first DCI format represents the DCI format 1A. Further, a new DCI format may be defined as the first DCI format. Here, the DCI format 1A may be transmitted on the PDCCH in the CSS and/or the USS.

That is, in a case where the first DCI format (for example, the DCI format 1A) is transmitted, the base station device performs the transmission on the PDSCH based on the PCI. Further, in a case where the first DCI format (for example, the DCI format 1A) is received, the terminal device performs the reception on the PDSCH based on the PCI.

Further, the condition B includes transmission of a DCI format other than the predetermined DCI format (hereinafter denoted as a second DCI format or a DCI format that is different from the predetermined DCI format also). Further, the condition B includes detection (decoding or reception) of the DCI format other than the predetermined DCI format.

Here, for example, the second DCI format represents a DCI format other than the DCI format 1A. For example, the second DCI format includes the DCI format 2 (that may be the DCI format 2C). Further, the second DCI format includes the DCI format X. Further, a new DCI format may be defined as the second DCI format.

That is, in a case where the second DCI format (for example, a DCI format other than the DCI format 1A) is transmitted, the base station device performs the transmission on the PDSCH based on the first configuration. Further, in a case where the second DCI format (for example, a DCI format other than the DCI format 1A) is received, the terminal device performs the reception on the PDSCH based on the first configuration.

Further, the condition A includes transmission (allocation) of the first DCI format in the CSS. Further, the condition A includes detection (decoding or reception) of the first DCI format in the CSS. That is, for example, the condition A includes transmission of the DCI format 1A in the CSS. Further, the condition A includes reception of the DCI format 1A in the CSS.

That is, in a case where the first DCI format (for example, the DCI format 1A) is transmitted in the CSS, the base station device performs the transmission on the PDSCH based on the PCI. Further, in a case where the first DCI format (for example, the DCI format 1A) is received in the CSS, the terminal device performs the reception on the PDSCH based on the PCI.

Further, the condition B includes transmission of the first DCI format or the second DCI format in the USS. Further, the condition B includes transmission of the second DCI format in the CSS. Further, the condition B includes detection (decoding or reception) of the first DCI format or the second DCI format in the USS. Further, the condition B includes detection (decoding or reception) of the second DCI format in the CSS.

That is, in a case where the first DCI format (for example, the DCI format 1A) or the second DCI format (for example, a DCI format other than the DCI format 1A) is transmitted in the USS, the base station device performs the transmission on the PDSCH based on the first configuration. Further, in a case where the second DCI format (for example, a DCI format other than the DCI format 1A) is transmitted in the CSS, the base station device performs the transmission on the PDSCH based on the first configuration.

Further, in a case where the first DCI format (for example, the DCI format 1A) or the second DCI format (for example, a DCI format other than the DCI format 1A) is received in the USS, the terminal device performs the reception on the PDSCH based on the first configuration. Further, in a case where the second DCI format (for example, a DCI format other than the DCI format 1A) is received in the CSS, the terminal device performs the reception on the PDSCH based on the first configuration.

Further, the condition A includes transmission (allocation) of the PDCCH with the CRC scrambled by the RA-RNTI. Further, the condition A includes transmission of the PDCCH with the CRC scrambled by the P-RNTI. Further, the condition A includes transmission of the PDCCH with the CRC scrambled by the SI-RNTI.

Further, the condition A includes detection (decoding or reception) of the PDCCH with the CRC scrambled by the RA-RNTI. Further, the condition A includes detection of the PDCCH with the CRC scrambled by the P-RNTI. Further, the condition A includes detection of the PDCCH with the CRC scrambled by the SI-RNTI.

That is, in a case where the PDCCH with the CRC scrambled by the RA-RNTI is transmitted, the base station device performs the transmission on the PDSCH based on the PCI. Further, in a case where the PDCCH with the CRC scrambled by the P-RNTI is transmitted, the base station device performs the transmission on the PDSCH based on the PCI. Further, in a case where the PDCCH with the CRC scrambled by the SI-RNTI is transmitted, the base station device performs the transmission on the PDSCH based on the PCI.

Further, in a case where the PDCCH with the CRC scrambled by the RA-RNTI is detected, the terminal device performs the reception on the PDSCH based on the PCI. Further, in a case where the PDCCH with the CRC scrambled by the P-RNTI is detected, the terminal device performs the reception on the PDSCH based on the PCI. Further, in a case where the PDCCH with the CRC scrambled by the SI-RNTI is detected, the terminal device performs the reception on the PDSCH based on the PCI.

Further, the condition B includes transmission (allocation) of the PDCCH with the CRC scrambled by the C-RNTI. Further, the condition B includes detection (decoding or reception) of the PDCCH with the CRC scrambled by the C-RNTI.

That is, in a case where the PDCCH with the CRC scrambled by the C-RNTI is transmitted, the base station device performs the transmission on the PDSCH based on the first configuration. Further, in a case where the PDCCH with the CRC scrambled by the C-RNTI is detected, the terminal device performs the reception on the PDSCH based on the first configuration.

FIG. 10 is another diagram that illustrates an example of a flow according to this embodiment. Here, as described above, in a certain MBSFN subframe, the cell-specific reference signals are transmitted only in the non-MBSFN area in the MBSFN subframe.

That is, for example, in a case where the cell 1 corresponds to the non-MBSFN subframe, the cell 2 corresponds to the MBSFN subframe, and a cell 3 corresponds to the non-MBSFN subframe in certain subframes, the base station device and the terminal device may perform transmission and reception on the PDSCH based on the positions of the cell-specific reference signals that correspond to the cell 1 and the positions of the cell-specific reference signals that correspond to the cell 3.

That is, for example, based on whether a certain subframe in a certain cell is the MBSFN subframe or the non-MBSFN subframe, the base station device and the terminal device may switch between performing transmission and reception on the PDSCH based on the positions of the cell-specific reference signals that correspond to the cell and not performing that.

In FIG. 10, the base station device switches operations (processes) in accordance with the condition. Here, the conditions (the condition A and the condition B) are as described above. Here, in the case of the condition A, the base station device identifies (recognizes or confirms) whether the subframe in the serving cell is the MBSFN subframe or the non-MBSFN subframe.

Here, in a case of the MBSFN subframe in the serving cell, the base station device does not perform the rate-matching based on the positions of the cell-specific reference signals of the serving cell and performs transmission on the PDSCH. That is, the base station device does not perform the rate-matching based on the positions of the cell-specific reference signals that are determined in accordance with the physical layer cell identity of the serving cell and performs transmission on the PDSCH.

Further, in a case of the non-MBSFN subframe in the serving cell, the base station device performs the rate-matching based only on the positions of the cell-specific reference signals of the serving cell and performs transmission on the PDSCH. That is, the base station device performs the transmission on the PDSCH based on the PCI.

Further, in the case of the condition B, the base station device identifies (recognizes or confirms) whether the subframe in a pattern that is configured for the terminal device (that is, a pattern of the MBSFN subframe) is the MBSFN subframe or the non-MB SFN subframe. As described above, the base station device may configure the MBSFN subframe (the pattern of the MBSFN subframe) by transmitting parameters (for example, the information about the MBSFN subframe) by using the higher layer signaling.

Here, in a case of the MBSFN subframe in the configured pattern, the base station device does not perform the rate-matching based on the indicated positions of the cell-specific reference signals and performs transmission on the PDSCH. That is, the base station device does not perform the rate-matching based on the positions of the cell-specific reference signals that are indicated by using the user-equipment specific configuration and performs transmission on the PDSCH.

Further, in a case of the non-MBSFN subframe in the configured pattern, the base station device performs the rate-matching based on the indicated positions of the cell-specific reference signals and performs transmission on the PDSCH. That is, the base station device performs the transmission on the PDSCH based on the first configuration.

Similarly, the terminal device switches operations (processes) in accordance with the condition. Here, the conditions (the condition A and the condition B) are as described above. Here, in the case of the condition A, the terminal device identifies (recognizes or confirms) whether the subframe in the serving cell is the MBSFN subframe or the non-MBSFN subframe.

Here, in the case of the MBSFN subframe in the serving cell, the terminal device performs reception on the PDSCH while assuming that the rate-matching based on the positions of the cell-specific reference signals of the serving cell is not performed. That is, the terminal device performs reception on the PDSCH while assuming that the rate-matching based on the positions of the cell-specific reference signals that are determined in accordance with the physical layer cell identity of the serving cell is not performed.

Further, in the case of the non-MB SFN subframe in the serving cell, the terminal device performs reception on the PDSCH while assuming that the rate-matching based only on the positions of the cell-specific reference signals of the serving cell is performed. That is, the terminal device performs the reception on the PDSCH based on the PCI.

Further, in the case of the condition B, the terminal device identifies (recognizes or confirms) whether the subframe in a pattern that is configured by the base station device (that is, the pattern of the MBSFN subframe) is the MBSFN subframe or the non-MBSFN subframe.

Here, in the case of the MBSFN subframe in the configured pattern, the terminal device performs reception on the PDSCH while assuming that the rate-matching based on the indicated positions of the cell-specific reference signals is not performed. That is, the terminal device performs reception on the PDSCH while assuming that the rate-matching based on the positions of the cell-specific reference signals that are indicated by using the user-equipment specific configuration is not performed.

Further, in the case of the non-MB SFN subframe in the configured pattern, the terminal device performs reception on the PDSCH while assuming that the rate-matching based on the indicated positions of the cell-specific reference signals is performed. That is, the terminal device performs the reception on the PDSCH based on the first configuration.

Here, a case where the resource elements are not the resource elements that are indicated (specified or configured) by using information that is transmitted by the base station device (that may be information that indicates the positions of the cell-specific reference signals or information that indicates the resource elements to which the physical signals or physical channels are mapped) will also be denoted as a first condition (that may be a first criterion).

Further, a case where the resource elements are present in the physical resource blocks that are allocated for transmission on the PDSCH will also be denoted as a second condition (that may be a second criterion). Further, the second condition includes a case where the resource elements are not used for transmission of the cell-specific reference signals.

Here, in the above description, a description is basically made about a process that is associated with the transmission and reception on the PDSCH based on the positions of the cell-specific reference signals. However, the base station device and the terminal device also perform transmission and reception on the PDSCH based on the resource elements to which the physical signals or physical channels other than the cell-specific reference signals are mapped.

Here, for example, the physical signals other than the cell-specific reference signal include the user equipment-specific reference signals, the MBSFN reference signals, channel state information reference signals, the synchronization signals, and so forth. Further, the physical channels other the cell-specific reference signal include a physical broadcast channel (PBCH).

Further, for example, the base station device and the terminal device transmit and receive the PDSCH that is mapped to the resource elements except the resource elements of the OFDM symbols that satisfy I<IDataStart in the first slot. Here, I denotes the numbers of the OFDM symbols in the slot. Further, the base station device may transmit information that indicates IDataStart to the terminal device.

Here, a case where the resource elements are not used for transmission of the physical signals other than the cell-specific reference signals is included in the second condition. Further, a case where the resource elements are not used for transmission of the physical channels other than the cell-specific reference signal is included in the second condition. Further, the second condition includes a case where the resource elements satisfy I<IDataStart in the first slot.

That is, the second condition includes at least a case where the resource elements are present in the physical resource blocks that are allocated for transmission on the PDSCH. Further, the second condition includes at least a case where the resource elements are not used for transmission of the cell-specific reference signals.

As described above, the base station device and the terminal device may transmit and receive information that indicates (specifies or configures) the resource elements. Here, the information that indicates the resource elements includes information that indicates the positions (allocations) of the resource elements. Further, the information that indicates the resource elements includes information that indicates the resource elements in which the neighboring cell (also referred to as other cell, coordinated cell, or associated cell) transmits the physical signal or physical channel.

Further, in the case of the condition B, the base station device maps the PDSCH to the resource elements that satisfy the first condition and the second condition. Further, in the case of the condition A, the base station device maps the PDSCH to the resource elements that satisfy the second condition.

Further, in the case of the condition B, the terminal device receives the PDSCH that is mapped to the resource elements that satisfy the first condition and the second condition. Further, in the case of the condition A, the terminal device receives the PDSCH that is mapped to the resource elements that satisfy the second condition.

An above-described method allows the base station device and the terminal device to transmit and receive the PDSCH without degrading the receive performance and to perform communication that efficiently uses radio resources. Further, the above-described method enables transmission and reception on the PDSCH while the positions of the physical signals or physical channels other than the PDSCH is more dynamically taken into account and thereby enables communication that efficiently uses the radio resources.

Further, the base station device and the terminal device may transmit and receive the PDSCH by using the condition A in a period in which a configuration in the RRC layer is performed (for example, a period in which a configuration by using the dedicated signals is performed). That is, transmission and reception on the PDSCH may be performed by using the condition A in a period which is caused while the configuration in the RRC layer is performed and in which the configuration is uncertain (unclear) (a period in which disagreement in the configuration occurs between the base station device and the terminal device).

That is, the base station device and the terminal device may maintain communication even in a period in which the configuration in the RRC layer is performed and may thereby perform communication that efficiently uses radio resources.

As described above, the base station device in this embodiment is a base station device that transmits the physical downlink shared channel to the mobile station device and includes transmitting information that indicates the resource element to the mobile station device, transmitting the physical downlink control channel that is used for scheduling the physical downlink shared channel to the mobile station device in the common search space or the user equipment-specific search space, mapping the physical downlink shared channel to the resource element that satisfies the first condition and the second condition in a case where the physical downlink control channel is transmitted in the user equipment-specific search space, and mapping the physical downlink shared channel to the resource element that satisfies the second condition in a case where the physical downlink control channel is transmitted in the common search space. The first condition is that the resource element is not the resource element that is indicated by using the information by the base station device, and the second condition is that the resource element is at least in the physical resource block that is allocated for transmission of the physical downlink shared channel.

Further, the base station device in this embodiment is a base station device that transmits the physical downlink shared channel to the mobile station device and includes transmitting information that indicates the resource element to the mobile station device, mapping the physical downlink shared channel to the resource element that satisfies the first condition and the second condition in a case where a prescribed downlink control information format that is used for scheduling the physical downlink shared channel is transmitted, and mapping the physical downlink shared channel to the resource element that satisfies the second condition in a case where the downlink control information format that is different from the prescribed downlink control information format that is used for scheduling the physical downlink shared channel is transmitted. The first condition is that the resource element is not the resource element that is indicated by using the information by the base station device, and the second condition is that the resource element is at least in the physical resource block that is allocated for transmission of the physical downlink shared channel.

Further, the base station device in this embodiment is a base station device that transmits the physical downlink shared channel to the mobile station device and includes transmitting information that indicates the resource element to the mobile station device, mapping the physical downlink shared channel to the resource element that satisfies the first condition and the second condition in a case where a prescribed downlink control information format that is used for scheduling the physical downlink shared channel or the downlink control information format that is different from the prescribed downlink control information format is transmitted in the user equipment-specific search space, and mapping the physical downlink shared channel to the resource element that satisfies the second condition in a case where the prescribed downlink control information format that is used for scheduling the physical downlink shared channel is transmitted in the common search space. The first condition is that the resource element is not the resource element that is indicated by using the information by the base station device, and the second condition is that the resource element is at least in the physical resource block that is allocated for transmission of the physical downlink shared channel.

Further, the mobile station device in this embodiment is a mobile station device that receives the physical downlink shared channel from the base station device and includes receiving information that indicates the resource element from the base station device, monitoring the physical downlink control channel that is used for scheduling the physical downlink shared channel in the common search space and/or the user equipment-specific search space, receiving the physical downlink shared channel that is mapped to the resource element that satisfies the first condition and the second condition from the base station device in a case where the physical downlink control channel is detected in the user equipment-specific search space, and receiving the physical downlink shared channel that is mapped to the resource element that satisfies the second condition from the base station device in a case where the physical downlink control channel is detected in the common search space. The first condition is that the resource element is not the resource element that is indicated by using the information by the base station device, and the second condition is that the resource element is at least in the physical resource block that is allocated for transmission of the physical downlink shared channel.

Further, the mobile station device in this embodiment is a mobile station device that receives the physical downlink shared channel from the base station device and includes receiving information that indicates the resource element from the base station device, receiving the physical downlink shared channel that is mapped to the resource element that satisfies the first condition and the second condition from the base station device in a case where a prescribed downlink control information format that is used for scheduling the physical downlink shared channel is received, and receiving the physical downlink shared channel that is mapped to the resource element that satisfies the second condition from the base station device in a case where the downlink control information format that is different from the prescribed downlink control information format that is used for scheduling the physical downlink shared channel is received. The first condition is that the resource element is not the resource element that is indicated by using the information by the base station device, and the second condition is that the resource element is at least in the physical resource block that is allocated for transmission of the physical downlink shared channel Further, the mobile station device in this embodiment is a mobile station device that receives the physical downlink shared channel from the base station device and includes receiving information that indicates the resource element from the base station device, receiving the physical downlink shared channel that is mapped to the resource element that satisfies the first condition and the second condition from the base station device in a case where a prescribed downlink control information format that is used for scheduling the physical downlink shared channel or the downlink control information format that is different from the prescribed downlink control information format is received in the user equipment-specific search space, and receiving the physical downlink shared channel that is mapped to the resource element that satisfies the second condition from the base station device in a case where the prescribed downlink control information format that is used for scheduling the physical downlink shared channel is received in the common search space. The first condition is that the resource element is not the resource element that is indicated by using the information by the base station device, and the second condition is that the resource element is at least in the physical resource block that is allocated for transmission of the physical downlink shared channel Further, a transmission method in this embodiment is a transmission method of a base station device that transmits the physical downlink shared channel to the mobile station device and includes transmitting information that indicates the resource element to the mobile station device, transmitting the physical downlink control channel that is used for scheduling the physical downlink shared channel to the mobile station device in the common search space or the user equipment-specific search space, mapping the physical downlink shared channel to the resource element that satisfies the first condition and the second condition in a case where the physical downlink control channel is transmitted in the user equipment-specific search space, and mapping the physical downlink shared channel to the resource element that satisfies the second condition in a case where the physical downlink control channel is transmitted in the common search space. The first condition is that the resource element is not the resource element that is indicated by using the information by the base station device, and the second condition is that the resource element is at least in the physical resource block that is allocated for transmission of the physical downlink shared channel.

Further, a transmission method in this embodiment is a transmission method of a base station device that transmits the physical downlink shared channel to the mobile station device and includes transmitting information that indicates the resource element to the mobile station device, mapping the physical downlink shared channel to the resource element that satisfies the first condition and the second condition in a case where a prescribed downlink control information format that is used for scheduling the physical downlink shared channel is transmitted, and mapping the physical downlink shared channel to the resource element that satisfies the second condition in a case where the downlink control information format that is different from the prescribed downlink control information format that is used for scheduling the physical downlink shared channel is transmitted. The first condition is that the resource element is not the resource element that is indicated by using the information by the base station device, and the second condition is that the resource element is at least in the physical resource block that is allocated for transmission of the physical downlink shared channel.

Further, a transmission method in this embodiment is a transmission method of a base station device that transmits the physical downlink shared channel to the mobile station device and includes transmitting information that indicates the resource element to the mobile station device, mapping the physical downlink shared channel to the resource element that satisfies the first condition and the second condition in a case where a prescribed downlink control information format that is used for scheduling the physical downlink shared channel or the downlink control information format that is different from the prescribed downlink control information format is transmitted in the user equipment-specific search space, and mapping the physical downlink shared channel to the resource element that satisfies the second condition in a case where the prescribed downlink control information format that is used for scheduling the physical downlink shared channel is transmitted in the common search space. The first condition is that the resource element is not the resource element that is indicated by using the information by the base station device, and the second condition is that the resource element is at least in the physical resource block that is allocated for transmission of the physical downlink shared channel.

Further, a transmission method in this embodiment is a transmission method of a mobile station device that receives the physical downlink shared channel from the base station device and includes receiving information that indicates the resource element from the base station device, monitoring the physical downlink control channel that is used for scheduling the physical downlink shared channel in the common search space and/or the user equipment-specific search space, receiving the physical downlink shared channel that is mapped to the resource element that satisfies the first condition and the second condition from the base station device in a case where the physical downlink control channel is detected in the user equipment-specific search space, and receiving the physical downlink shared channel that is mapped to the resource element that satisfies the second condition from the base station device in a case where the physical downlink control channel is detected in the common search space. The first condition is that the resource element is not the resource element that is indicated by using the information by the base station device, and the second condition is that the resource element is at least in the physical resource block that is allocated for transmission of the physical downlink shared channel.

Further, a transmission method in this embodiment is a transmission method of a mobile station device that receives the physical downlink shared channel from the base station device and includes receiving information that indicates the resource element from the base station device, receiving the physical downlink shared channel that is mapped to the resource element that satisfies the first condition and the second condition from the base station device in a case where a prescribed downlink control information format that is used for scheduling the physical downlink shared channel is received, and receiving the physical downlink shared channel that is mapped to the resource element that satisfies the second condition from the base station device in a case where the downlink control information format that is different from the prescribed downlink control information format that is used for scheduling the physical downlink shared channel is received. The first condition is that the resource element is not the resource element that is indicated by using the information by the base station device, and the second condition is that the resource element is at least in the physical resource block that is allocated for transmission of the physical downlink shared channel. Further, a transmission method in this embodiment is a transmission method of a mobile station device that receives the physical downlink shared channel from the base station device and includes receiving information that indicates the resource element from the base station device, receiving the physical downlink shared channel that is mapped to the resource element that satisfies the first condition and the second condition from the base station device in a case where a prescribed downlink control information format that is used for scheduling the physical downlink shared channel or the downlink control information format that is different from the prescribed downlink control information format is received in the user equipment-specific search space, and receiving the physical downlink shared channel that is mapped to the resource element that satisfies the second condition from the base station device in a case where the prescribed downlink control information format that is used for scheduling the physical downlink shared channel is received in the common search space. The first condition is that the resource element is not the resource element that is indicated by using the information by the base station device, and the second condition is that the resource element is at least in the physical resource block that is allocated for transmission of the physical downlink shared channel.

Further, an integrated circuit in this embodiment is an integrated circuit that is installed in a base station device that transmits the physical downlink shared channel to the mobile station device and causes the base station device to provide a function of transmitting information that indicates the resource element to the mobile station device, a function of transmitting the physical downlink control channel that is used for scheduling the physical downlink shared channel to the mobile station device in the common search space or the user equipment-specific search space, a function of mapping the physical downlink shared channel to the resource element that satisfies the first condition and the second condition in a case where the physical downlink control channel is transmitted in the user equipment-specific search space, and a function of mapping the physical downlink shared channel to the resource element that satisfies the second condition in a case where the physical downlink control channel is transmitted in the common search space. The first condition is that the resource element is not the resource element that is indicated by using the information by the base station device, and the second condition is that the resource element is at least in the physical resource block that is allocated for transmission of the physical downlink shared channel.

Further, an integrated circuit in this embodiment is an integrated circuit that is installed in a base station device that transmits the physical downlink shared channel to the mobile station device and causes the base station device to provide a function of transmitting information that indicates the resource element to the mobile station device, a function of mapping the physical downlink shared channel to the resource element that satisfies the first condition and the second condition in a case where a prescribed downlink control information format that is used for scheduling the physical downlink shared channel is transmitted, and a function of mapping the physical downlink shared channel to the resource element that satisfies the second condition in a case where the downlink control information format that is different from the prescribed downlink control information format that is used for scheduling the physical downlink shared channel is transmitted. The first condition is that the resource element is not the resource element that is indicated by using the information by the base station device, and the second condition is that the resource element is at least in the physical resource block that is allocated for transmission of the physical downlink shared channel.

Further, an integrated circuit in this embodiment is an integrated circuit that is installed in a base station device that transmits the physical downlink shared channel to the mobile station device and causes the base station device to provide a function of transmitting information that indicates the resource element to the mobile station device, a function of mapping the physical downlink shared channel to the resource element that satisfies the first condition and the second condition in a case where a prescribed downlink control information format that is used for scheduling the physical downlink shared channel or the downlink control information format that is different from the prescribed downlink control information format is transmitted in the user equipment-specific search space, and a function of mapping the physical downlink shared channel to the resource element that satisfies the second condition in a case where the prescribed downlink control information format that is used for scheduling the physical downlink shared channel is transmitted in the common search space. The first condition is that the resource element is not the resource element that is indicated by using the information by the base station device, and the second condition is that the resource element is at least in the physical resource block that is allocated for transmission of the physical downlink shared channel.

Further, an integrated circuit in this embodiment is an integrated circuit that is installed in a mobile station device that receives the physical downlink shared channel from the base station device and causes the mobile station device to provide a function of receiving information that indicates the resource element from the base station device, a function of monitoring the physical downlink control channel that is used for scheduling the physical downlink shared channel in the common search space and/or the user equipment-specific search space, a function of receiving the physical downlink shared channel that is mapped to the resource element that satisfies the first condition and the second condition from the base station device in a case where the physical downlink control channel is detected in the user equipment-specific search space, and a function of receiving the physical downlink shared channel that is mapped to the resource element that satisfies the second condition from the base station device in a case where the physical downlink control channel is detected in the common search space. The first condition is that the resource element is not the resource element that is indicated by using the information by the base station device, and the second condition is that the resource element is at least in the physical resource block that is allocated for transmission of the physical downlink shared channel.

Further, an integrated circuit in this embodiment is an integrated circuit that is installed in a mobile station device that receives the physical downlink shared channel from the base station device and causes the mobile station device to provide a function of receiving information that indicates the resource element from the base station device, a function of receiving the physical downlink shared channel that is mapped to the resource element that satisfies the first condition and the second condition from the base station device in a case where a prescribed downlink control information format that is used for scheduling the physical downlink shared channel is received, and a function of receiving the physical downlink shared channel that is mapped to the resource element that satisfies the second condition from the base station device in a case where the downlink control information format that is different from the prescribed downlink control information format that is used for scheduling the physical downlink shared channel is received. The first condition is that the resource element is not the resource element that is indicated by using the information by the base station device, and the second condition is that the resource element is at least in the physical resource block that is allocated for transmission of the physical downlink shared channel.

Further, an integrated circuit in this embodiment is an integrated circuit that is installed in a mobile station device that receives the physical downlink shared channel from the base station device and causes the mobile station device to provide a function of receiving information that indicates the resource element from the base station device, a function of receiving the physical downlink shared channel that is mapped to the resource element that satisfies the first condition and the second condition from the base station device in a case where a prescribed downlink control information format that is used for scheduling the physical downlink shared channel or the downlink control information format that is different from the prescribed downlink control information format is received in the user equipment-specific search space, and a function of receiving the physical downlink shared channel that is mapped to the resource element that satisfies the second condition from the base station device in a case where the prescribed downlink control information format that is used for scheduling the physical downlink shared channel is received in the common search space. The first condition is that the resource element is not the resource element that is indicated by using the information by the base station device, and the second condition is that the resource element is at least in the physical resource block that is allocated for transmission of the physical downlink shared channel.

Further, a mobile communication system in this embodiment is a mobile communication system in which a mobile station device receives the physical downlink shared channel from a base station device and in which the base station device transmits information that indicates the resource element to the mobile station device and transmits the physical downlink control channel that is used for scheduling the physical downlink shared channel in the common search space and/or the user equipment-specific search space to the mobile station device, and the mobile station device receives the physical downlink shared channel that is mapped to the resource element that satisfies the first condition and the second condition from the base station device in a case where the physical downlink control channel is detected in the user equipment-specific search space and receives the physical downlink shared channel that is mapped to the resource element that satisfies the second condition from the base station device in a case where the physical downlink control channel is detected in the common search space. The first condition is that the resource element is not the resource element that is indicated by using the information by the base station device, and the second condition is that the resource element is at least in the physical resource block that is allocated for transmission of the physical downlink shared channel.

Further, a mobile communication system in this embodiment is a mobile communication system in which a mobile station device receives the physical downlink shared channel from the base station device and in which the base station device transmits information that indicates the resource element to the mobile station device, and the mobile station device receives the physical downlink shared channel that is mapped to the resource element that satisfies the first condition and the second condition from the base station device in a case where a prescribed downlink control information format that is used for scheduling the physical downlink shared channel is received and receives the physical downlink shared channel that is mapped to the resource element that satisfies the second condition from the base station device in a case where the downlink control information format that is different from the prescribed downlink control information format that is used for scheduling the physical downlink shared channel is received. The first condition is that the resource element is not the resource element that is indicated by using the information by the base station device, and the second condition is that the resource element is at least in the physical resource block that is allocated for transmission of the physical downlink shared channel.

Further, a mobile communication system in this embodiment is mobile communication system in which a mobile station device receives the physical downlink shared channel from the base station device and in which the base station device transmits information that indicates the resource element to the mobile station device, and the mobile station device receives the physical downlink shared channel that is mapped to the resource element that satisfies the first condition and the second condition from the base station device in a case where a prescribed downlink control information format that is used for scheduling the physical downlink shared channel or the downlink control information format that is different from the prescribed downlink control information format is received in the user equipment-specific search space and receives the physical downlink shared channel that is mapped to the resource element that satisfies the second condition from the base station device in a case where the prescribed downlink control information format that is used for scheduling the physical downlink shared channel is received in the common search space. The first condition is that the resource element is not the resource element that is indicated by using the information by the base station device, and the second condition is that the resource element is at least in the physical resource block that is allocated for transmission of the physical downlink shared channel.

A program that operates in the primary base station, the secondary base station, and the terminal device that relate to the present invention is a program that controls a CPU or the like so that functions of the above embodiment related to the present invention are realized (a program that allows a computer to function). In addition, information that is dealt with by such devices is temporarily accumulated in a RAM during a process of the information, thereafter stored in various kinds of ROMs or HDDs. The information is read out, corrected, and written by the CPU as necessary. Recording media to store the program may be any of semiconductor media (for example, ROM, non-volatile memory card, and so forth), optical recording media (for example, DVD, MO, MD, CD, BD, and so forth), magnetic recording media (for example, magnetic tape, flexible disk, and so forth), and so forth. Further, there may be a case where functions of the above-described embodiment are not only realized by executing the loaded program but also functions of the present invention are realized by cooperative processing with an operating system, other application programs, or the like based on instructions of the program.

Further, in a case where the program is distributed in market, the program may be distributed by storing the program in portable recording media and may be transferred to server computers that are connected via a network such as the Internet. In such a case, memory devices of the server computers are included in the present invention. Further, a unit or the whole of the primary base station, the secondary base station, and the terminal device in the above-described embodiment may typically be realized as an LSI that is an integrated circuit. Here, function blocks of the secondary base station, the secondary base station, and the terminal device may individually be formed into chips, or a unit or the whole of those may be integrated into a chip. Further, a method of forming the integrated circuit is not limited to an LSI, but the integrated circuit may be realized as a dedicated circuit, a general purpose processor, or the like. Further, in a case where a technology of forming an integrated circuit that replaces the LSI emerges as a result of progress of a semiconductor technology, an integrated circuit by the technology may be used.

The embodiment of the present invention has been described with reference to the drawings in the foregoing. However, a specific configuration is not limited to the embodiment, and the present invention includes design modifications or the like within a scope that does not depart from the gist of the present invention. Various modifications are possible in the scope recited in claims in the present invention, and embodiments that are obtained by appropriately combining technical means that are disclosed in different embodiments are included in the technical scope of the present invention. Further, embodiments include configurations in which elements that are described in the above embodiments and provide similar effects are mutually substituted.

INDUSTRIAL APPLICABILITY

The present invention is preferable for a terminal device, a base station device, a communication method, an integrated circuit, and a radio communication system.

DESCRIPTION OF REFERENCE NUMERALS 100 base station device
101 data control unit
102 transmit data modulation unit
103 radio unit
104 scheduling unit
105 channel estimation unit
106 receive data demodulation unit
107 data extraction unit
108 higher layer
109 antenna
200 terminal device
201 data control unit
202 transmit data modulation unit
203 radio unit
204 scheduling unit
205 channel estimation unit
206 receive data demodulation unit
207 data extraction unit
208 higher layer
209 antenna
301 primary base station
302 secondary base station
303 terminal device
304, 305 downlink

The invention claimed is:

1. A user equipment comprising:
receiving circuitry that monitors, in a non-MBSFN (Multicast/Broadcast over Single Frequency Network) subframe, a first physical downlink control channel with CRC (Cyclic Redundancy Check) scrambled by C-RNTI (Cell-Radio Network Temporary Identifier) with a first downlink control information format and a second physical downlink control channel with CRC scrambled by the C-RNTI with a second downlink control information format, the first downlink control information format not including downlink control information, the second downlink control information format including the downlink control information, the downlink control information indicating one parameter set from a plurality of parameter sets configured by a higher layer signal, each of the plurality of parameter sets providing a frequency shift and a number of antenna ports;
the receiving circuitry that decodes, based on a detection of the first downlink control information format, a physical downlink shared channel in the non-MBSFN subframe, resource elements to which the physical downlink shared channel is mapped being determined based on positions of cell-specific reference signals that are given by using a physical layer cell identity,
the receiving circuitry that decodes, based on a detection of the second downlink control information format, the physical downlink shared channel in the non-MBSFN subframe, the resource elements to which the physical downlink shared channel is mapped are determined based on positions of the cell-specific reference signals that are given by using at least the frequency shift and the number of antenna ports provided by the one parameter set, the one parameter set being indicated by the downlink control information included in the second downlink control information format.

2. The user equipment according to claim 1, wherein the first physical downlink control channel is monitored in a user equipment-specific search space and a common search space.

3. The user equipment according to claim 1, wherein the second physical downlink control channel is monitored only in a user equipment-specific search space.

4. A base station device comprising:
transmitting circuitry that transmits, in a non-MBSFN (Multicast/Broadcast over Single Frequency Network) subframe, a first physical downlink control channel with CRC (Cyclic Redundancy Check) scrambled by C-RNTI (Cell-Radio Network Temporary Identifier) with a first downlink control information format and a second physical downlink control channel with CRC scrambled by the C-RNTI with a second downlink control information format, the first downlink control information format not including downlink control information, the second downlink control information format including the downlink control information, the downlink control information indicating one parameter set from a plurality of parameter sets configured by a higher layer signal, each of the plurality of parameter sets providing a frequency shift and a number of antenna ports;
the transmitting circuitry that transmits, based on the first downlink control information format, a physical downlink shared channel in the non-MBSFN subframe, resource elements to which the physical downlink shared channel is mapped being determined based on positions of cell-specific reference signals that are given by using a physical layer cell identity,
the transmitting circuitry that transmit, based on the second downlink control information format, the physical downlink shared channel in the non-MBSFN subframe, the resource elements to which the physical downlink shared channel is mapped are determined based on positions of the cell-specific reference signals that are given by using at least the frequency shift and the number of antenna ports provided by the one parameter set, the one parameter set being indicated by the downlink control information included in the second downlink control information format.

5. The base station device according to claim 4, wherein the first physical downlink control channel is transmitted in a user equipment-specific search space and a common search space.

6. The base station device according to claim 4, wherein the second physical downlink control channel is monitored only in a user equipment-specific search space.

7. A communication method of a user equipment, the communication method comprising:

monitoring, in a non-MBSFN (Multicast/Broadcast over Single Frequency Network) subframe, a first physical downlink control channel with CRC (Cyclic Redundancy Check) scrambled by C-RNTI (Cell-Radio Network Temporary Identifier) with a first downlink control information format and a second physical downlink control channel with CRC scrambled by the C-RNTI with a second downlink control information format, the first downlink control information format not including downlink control information, the second downlink control information format including the downlink control information, the downlink control information indicating one parameter set from a plurality of parameter sets configured by a higher layer signal, each of the plurality of parameter sets providing a frequency shift and a number of antenna ports;

decoding, based on a detection of the first downlink control information format, a physical downlink shared channel in the non-MBSFN subframe, resource elements to which the physical downlink shared channel is mapped being determined based on positions of cell-specific reference signals that are given by using at a physical layer cell identity, decoding, based on a detection of the second downlink control information format, the physical downlink shared channel in the non-MBSFN subframe, the resource elements to which the physical downlink shared channel is mapped are determined based on positions of the cell-specific reference signals that are given by using at least the frequency shift and the number of antenna ports provided by the one parameter set, the one parameter set being indicated by the downlink control information included in the second downlink control information format.

8. The communication method according to claim 7, wherein the first physical downlink control channel is monitored in a user equipment-specific search space and a common search space.

9. The communication method according to claim 7, wherein the second physical downlink control channel is monitored only in a user equipment-specific search space.

10. A communication method of a base station device, the communication method comprising:

transmitting, in a non-MBSFN (Multicast/Broadcast over Single Frequency Network) subframe, a first physical downlink control channel with CRC (Cyclic Redundancy Check) scrambled by C-RNTI (Cell-Radio Network Temporary Identifier) with a first downlink control information format and a second physical downlink control channel with CRC scrambled by the C-RNTI with a second downlink control information format, the first downlink control information format not including downlink control information, the second downlink control information format including the downlink control information, the downlink control information indicating one parameter set from a plurality of parameter sets configured by a higher layer signal, each of the plurality of parameter sets providing a frequency shift and a number of antenna ports;

transmitting, based on the first downlink control information format, a physical downlink shared channel in the non-MBSFN subframe, resource elements to which the physical downlink shared channel is mapped being determined based on positions of cell-specific reference signals that are given by using a physical layer cell identity, transmitting, based on the second downlink control information format, the physical downlink shared channel in the non-MBSFN subframe, the resource elements to which the physical downlink shared channel is mapped are determined based on positions of the cell-specific reference signals that are given by using at least the frequency shift and the number of antenna ports provided by the one parameter set, the one parameter set being indicated by the downlink control information included in the second downlink control information format.

11. The communication method according to claim 10, wherein the first physical downlink control channel is transmitted in a user equipment-specific search space and a common search space.

12. The communication method according to claim 10, wherein the second physical downlink control channel is monitored only in a user equipment-specific search space.

* * * * *